(12) United States Patent
Toyoda

(10) Patent No.: US 11,645,763 B2
(45) Date of Patent: May 9, 2023

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Takuya Toyoda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/667,339

(22) Filed: Oct. 29, 2019

(65) Prior Publication Data
US 2020/0134841 A1 Apr. 30, 2020

(30) Foreign Application Priority Data

Oct. 31, 2018 (JP) .............................. JP2018-205712
Oct. 31, 2018 (JP) .............................. JP2018-205713

(51) Int. Cl.
*G06T 7/246* (2017.01)

(52) U.S. Cl.
CPC .... *G06T 7/246* (2017.01); *G06T 2207/10016* (2013.01); *G06T 2207/30196* (2013.01)

(58) Field of Classification Search
CPC .......... G06T 7/246; G06T 2207/30196; G06T 2207/10016; G06T 7/248; G06K 9/00369; G06K 9/00711
See application file for complete search history.

(56) References Cited

U.S. PATENT DOCUMENTS

2014/0147012 A1* 5/2014 Park ..................... G06T 7/223
382/107
2019/0130582 A1* 5/2019 Cheng .................... G06V 20/52

FOREIGN PATENT DOCUMENTS

| JP | 2002-016911 A | 1/2002 | |
| JP | 2009-027457 A | 2/2009 | |
| JP | 2009027457 | * 2/2009 | ............... H04N 1/41 |
| JP | 2009-089354 A | 4/2009 | |
| JP | 2009089354 | * 4/2009 | ............... H03M 7/30 |
| JP | 2013-187769 A | 9/2013 | |

(Continued)

OTHER PUBLICATIONS

Office Action dated Dec. 2, 2022, in related Japanese Patent Application No. 2018-205713 (8 pages).

*Primary Examiner* — Amara Abdi
(74) *Attorney, Agent, or Firm* — Venable LLP

(57) ABSTRACT

An image processing apparatus detects a tracking target object in an image, executes tracking processing to track the object, determines whether an attribute of an object detected from the image is a predetermined attribute, identifies, when a first state in which the object is detected changes to a second state with the object not detected, a given object included in the image and positioned at least partially in front of the object in the second state, based on a position of the object in the first state, controls the tracking processing, based on a determination whether an attribute of the given object is the predetermined attribute, and determines, based on the result, whether to continue the tracking processing. The tracking processing continues until at least a predetermined time has elapsed when a determination to continue the tracking processing on the tracking target object for the predetermined time has been made.

24 Claims, 22 Drawing Sheets

(56) References Cited

FOREIGN PATENT DOCUMENTS

| JP | 2017-027197 A | | 2/2017 | | |
|----|---------------|---|--------|---|---|
| JP | 2017027197 | * | 2/2017 | ............... | G06T 7/20 |

* cited by examiner

|  | MOVEMENT OF PERSON | NO MOVEMENT OF PERSON |
|---|---|---|
| MOVEMENT OF OBJECT THAT HUMAN BODY IS HIDDEN BEHIND | CONTINUE | DETERMINE BASED ON TIME THAT HAS ELAPSED SINCE HUMAN BODY BECAME HIDDEN BEHIND OBJECT |
| NO MOVEMENT OF OBJECT THAT HUMAN BODY IS HIDDEN BEHIND | DETERMINE BASED ON TIME THAT HAS ELAPSED SINCE HUMAN BODY BECAME HIDDEN BEHIND OBJECT | STOP |

IMAGE PROCESSING APPARATUS, IMAGE PROCESSING METHOD, AND NON-TRANSITORY COMPUTER-READABLE STORAGE MEDIUM

This application claims the benefit of Japanese Patent Application No. 2018-205712, filed on Oct. 31, 2018, and Japanese Patent Application No. 2018-205713, filed on Oct. 31, 2018, which are hereby incorporated by reference herein in their entirety.

BACKGROUND OF THE INVENTION

Field of the Invention

The present invention relates to an object tracking technique.

Description of the Related Art

In a network camera, there is known a function for detecting a person or tracking a specific person by analyzing an input video. A pattern matching method that uses features unique to a human body such as the face or the shape of a human body is known as a method of detecting a person in an input video.

However, in a pattern matching method, it is known that the detection accuracy decreases when a portion of a target object is missing. Hence, the method is problematic in that the target object cannot be detected if the target object is not visible because it is hidden behind some kind of an object, and this will obstruct the execution of the tracking processing.

Japanese Patent-Laid Open No. 2017-27197 discloses a method of implementing continuous tracking processing by grasping the front-and-back relationship between persons to hold tracking information even when a target person is invisible because he/she is hidden behind another person, and restarting the tracking processing when the target person is visible again.

The method disclosed in Japanese Patent-Laid Open No. 2017-27197 assumes a case in which tracking is interrupted when persons overlap, and the object of this method is to continue the tracking after the overlap has been resolved. However, in a case in which a tracking target object becomes invisible because the tracking target object has become hidden behind an object other than a person, it may be better to continue the tracking processing because the overlap will be resolved quickly or it may be better to end the tracking processing because the overlap will not be resolved for a long time. More specifically, in a case in which a person becomes invisible because he/she is passing behind a tree, it is better to continue the tracking processing because the possibility that the person will remain behind the tree is low. On the contrary, in a case in which a person becomes invisible because he/she is hidden by a building or a car, it is better to end the tracking processing because the person may have entered the building or the car.

In addition, a dynamic ROI (region of interest) is known as a technique used to reduce the bit rate for transferring a video while maintaining the image quality of an object of interest of a user. In this technique, a region is set to the detected object. Bit rate reduction is implemented by reducing the data amount by setting a large code amount to a region (region of interest) where the object of interest of the user is present to increase the image quality of the region, and setting a small code amount to a region (non region of interest [non-ROI]) where an object that is not of interest for the user is present to decrease the image quality of the region.

However, the visibility of the object of interest may degrade depending on the setting of the ROI in some cases. To address this problem of visibility degradation caused by a difference between the image quality of a region of interest and the image quality of a background region, Japanese Patent-Laid Open No. 2009-27457 discloses a method of preventing the degradation in visibility by setting a different code amount to a boundary region in between the region of interest and the background region. Also, to address the problem of ghosting that occurs when there is movement in the ROI in a state in which the frequency of coding in the non-ROI is less than the frequency of coding in the ROI, Japanese Patent Laid-Open No. 2013-187769 discloses the following technique. That is, Japanese Patent Laid-Open No. 2013-187769 discloses a technique for preventing the degradation of visibility by using the same code amount as that of the non-ROI to encode, in the ROI of the preceding frame, a region which does not overlap the ROI of the current frame to prevent the occurrence of ghosting.

The methods disclosed in Japanese Patent-Laid Open Nos. 2009-27457 and 2013-187769 do not consider visibility degradation that occurs when ROIs that have been set with different code amounts overlap. Since a region is set to a detected object based on the feature amount of an object extracted in the dynamic ROI, it will be impossible to set a region because the overlap of objects will reduce the feature amount of a background object and obstruct the detection of this object. As a result, the same code amount will be set to the background object and the foreground object in the same region, and the visibility of the background object will degrade. For example, when a person region, which has been set with a large code amount, passes behind a tree region, which has been set with a small code amount, the visibility will degrade due to the ROI setting of the person becoming similar to the ROI setting of the tree regardless of the fact that the person is visible from the gaps between the trunk, the branches, and the leaves of the tree.

SUMMARY OF THE INVENTION

The present invention provides a technique for controlling tracking processing for an object that has become invisible because the object has become hidden behind another object.

According to the first aspect of the present invention, there is provided an image processing apparatus comprising a tracking unit configured to detect a tracking target object in a moving image and execute tracking processing to track the tracking target object, an attribute determination unit configured to determine an attribute of an object included in the moving image, a specification unit configured to specify, when a first state in which the tracking target object is detected changes to a second state in which the tracking target object is not detected, an object, which is included in the moving image and is partially positioned in front of the tracking target object in the second state, based on a position of the tracking target object in the first state, and a tracking control unit configured to control, based on the attribute of the object specified by the specification unit, the tracking processing performed on the tracking target object by the tracking unit.

According to the second aspect of the present invention, there is provided an image processing method comprising detecting a tracking target object in a moving image and executing tracking processing to track the tracking target object, determining an attribute of an object included in the moving image, specifying, when a first state in which the tracking target object is detected changes to a second state in which the tracking target object is not detected, an object, which is included in the moving image and is partially positioned in front of the tracking target object in the second state, based on a position of the tracking target object in the first state, and controlling, based on the attribute of the specified object, the tracking processing performed on the tracking target object.

According to the third aspect of the present invention, there is provided a non-transitory computer-readable storage medium storing a program for causing a computer to function as a tracking unit configured to detect a tracking target object in a moving image and execute tracking processing to track the tracking target object, an attribute determination unit configured to determine an attribute of an object included in the moving image, a specification unit configured to specify, when a first state in which the tracking target object is detected changes to a second state in which the tracking target object is not detected, an object, which is included in the moving image and is partially positioned in front of the tracking target object in the second state, based on a position of the tracking target object in the first state, and a tracking control unit configured to control, based on the attribute of the object specified by the specification unit, the tracking processing performed on the tracking target object by the tracking unit.

Further features of the present invention will become apparent from the following description of exemplary embodiments (with reference to the attached drawings).

DESCRIPTION OF THE EMBODIMENTS

Embodiments of the present invention will now be described with reference to the accompanying drawings. Note that each embodiment to be described below is an example of detailed implementation of the present invention and is a detailed embodiment of the arrangement described in the appended claims.

First Embodiment

Figure 1:
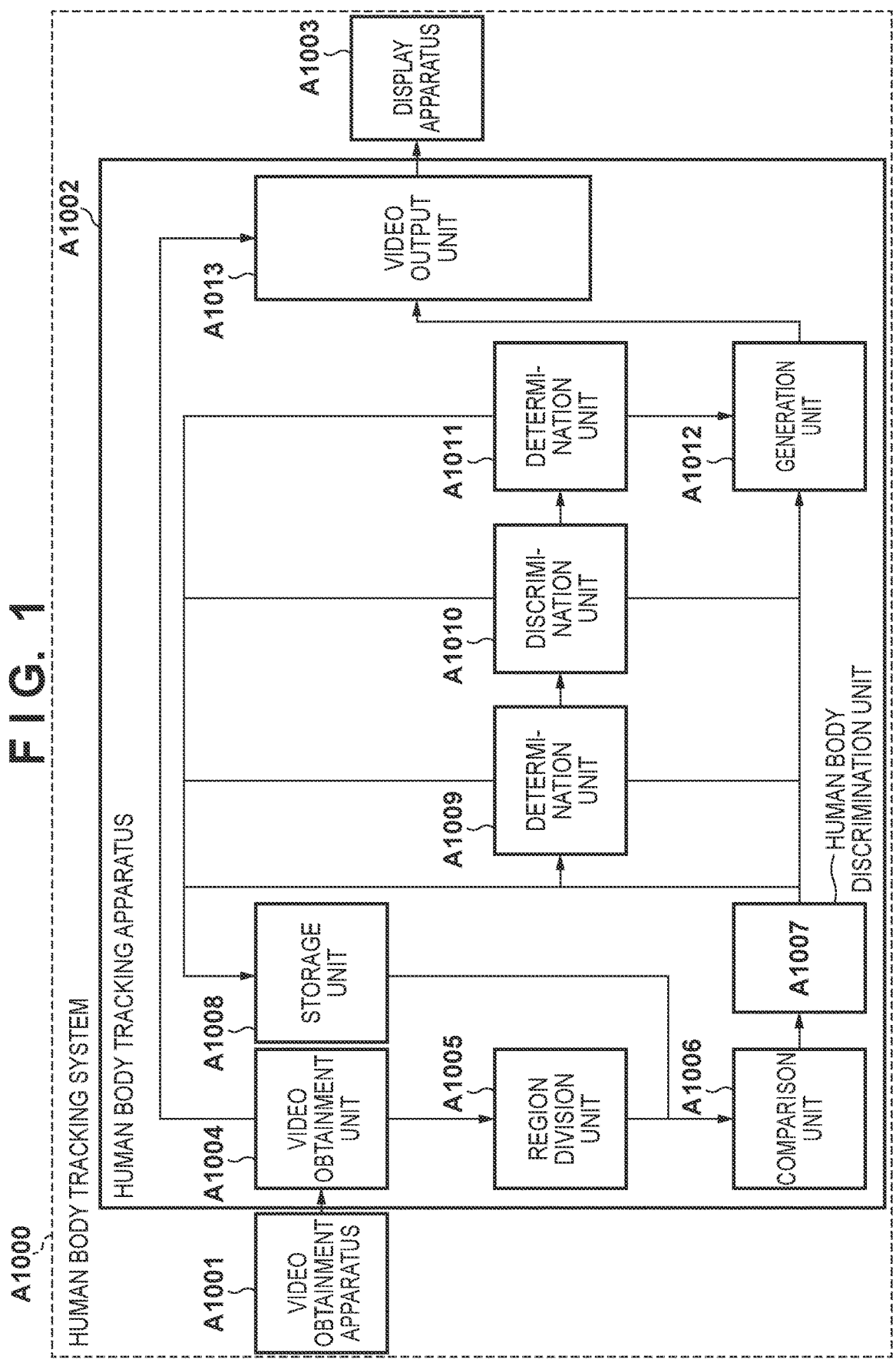
FIG. 1 is a block diagram showing an example of the functional arrangement of a human body tracking system.

An example of the functional arrangement of a human body tracking system according to this embodiment will be described first with reference to the block diagram of FIG. 1. A human body tracking system A1000 of FIG. 1 according to this embodiment is a system that tracks a human body in a video and displays the video together with the tracking result. As shown in FIG. 1, the human body tracking system A1000 includes a video obtainment apparatus A1001 that obtains a video, a human body tracking apparatus A1002 that tracks a human body in the video, and a display apparatus A1003 that displays the image of each frame from the human body tracking apparatus A1002.

The video obtainment apparatus A1001 and the human body tracking apparatus A1002 are connected to each other via a wireless network and/or a wired network. In addition, the human body tracking apparatus A1002 and the display apparatus A1003 are connected to each other via a wireless network and/or a wired network.

The video obtainment apparatus A1001 will be described first. The video obtainment apparatus A1001 is an apparatus that obtains a video (moving image) and supplies the image of each frame forming the video to the human body tracking apparatus A1002. The forms in which a video is obtained and supplied from the video obtainment apparatus A1001 are not limited to a specific obtainment form or supplying form.

For example, the video obtainment apparatus A1001 may obtain a video held in the self-apparatus or a video held by an external device, and may sequentially supply the image of each frame of the obtained video to the human body tracking apparatus A1002. The video obtainment apparatus A1001 may also capture a video and sequentially supply the image of each frame of the captured video to the human body tracking apparatus A1002.

The human body tracking apparatus A1002 (image processing apparatus) will be described next. The human body tracking apparatus A1002 performs human body tracking processing on the image of each frame supplied from the video obtainment apparatus A1001, and outputs the image and the result of performing the tracking processing on the image to the display apparatus A1003. In the case of an image which includes overlapping objects (the background object is a human body), the human body tracking apparatus A1002 determines whether to perform human body tracking processing in the image in accordance with whether the foreground object of the overlapping objects is a predetermined object. The human body tracking apparatus A1002 will control the human body tracking processing in the image in accordance with the result of this determination.

A video obtainment unit A1004 obtains the image of each frame supplied from the video obtainment apparatus A1001.

A region division unit A1005 performs region division on each image obtained by the video obtainment unit A1004, detects a region (object region) of an object in the image, and specifies an attribute (the type of the object or the like) of the object (subject) in the region. Various kinds of methods such as region splitting, super parsing, and fully convolutional neural network (CNN) by deep learning are known as methods for region division. Although it is assumed that fully convolutional neural network that allows region division to be performed highly accurately will be used in this embodiment, any of the methods may be used. Since region splitting, super parsing, fully convolutional neural network, and the like, are known techniques, a description related to these region division techniques will be omitted. The region division unit A1005 will generate, for each object region detected from the image, object information that includes information (for example, the coordinate position of the upper left corner and the coordinate position of the lower right corner of the object region) for specifying the object region in the image and the attribute of the object in the object region. Note that the attribute of the object may be determined based on user input.

A comparison unit A1006 uses the object information generated for the image of the current frame by the region division unit A1005 and "past frame object information" stored in a storage unit A1008 to determine the front-and-back relationship and the relationship of the concealment between the overlapping objects in the image of the current frame. Subsequently, although the comparison unit A1006 will output the object information generated for the image of the current frame by the region division unit A1005, the comparison unit will output the pieces of object information of the overlapping objects in the image of the current frame upon adding information expressing the front-and-back relationship and the relationship of the concealment between the objects to the object information of each overlapping object.

Figure 3:
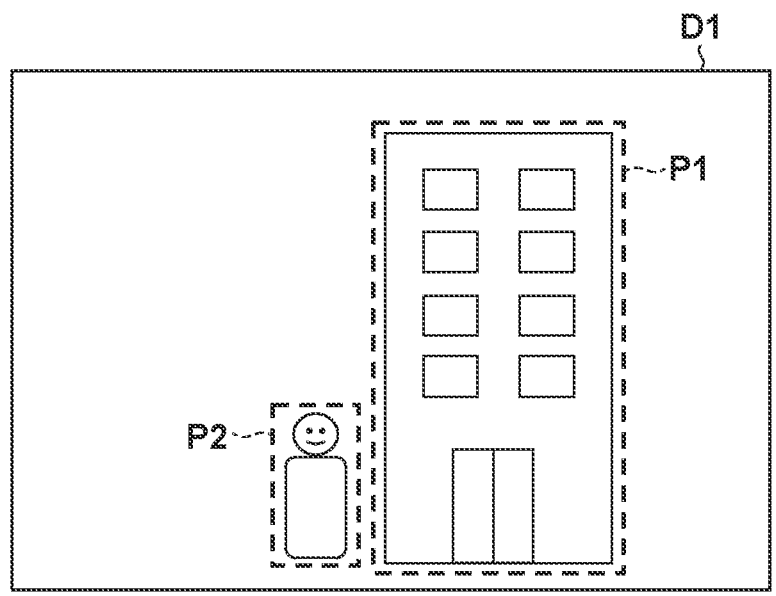
FIG. 3 is a view showing an image D1.

The operation of the comparison unit A1006 will be described by raising a more specific example. An image D1 shown in FIG. 3 is an (f−2)th frame image (f is an integer equal to 3 or more), and an object region P2 of a human body and an object region P1 of a building have been detected in the image D1. Object information including an attribute "human body" of the object in the object region P2 and information (for example, the coordinate positions of the upper left corner and the lower right corner of the object region P2) for specifying the object region P2 in the image D1 is generated for the object region P2 of the human body. In a similar manner, object information including an attribute "building" of the object in the object region P1 and information (for example, the coordinate positions of the upper left corner and the lower right corner of the object region P1) for specifying the object region P1 in the image D1 is generated for the object region P1 of the building. As shown in FIG. 3 a state in which one of the human body and the building overlaps the other has not occurred in the image D1.

Figure 4:
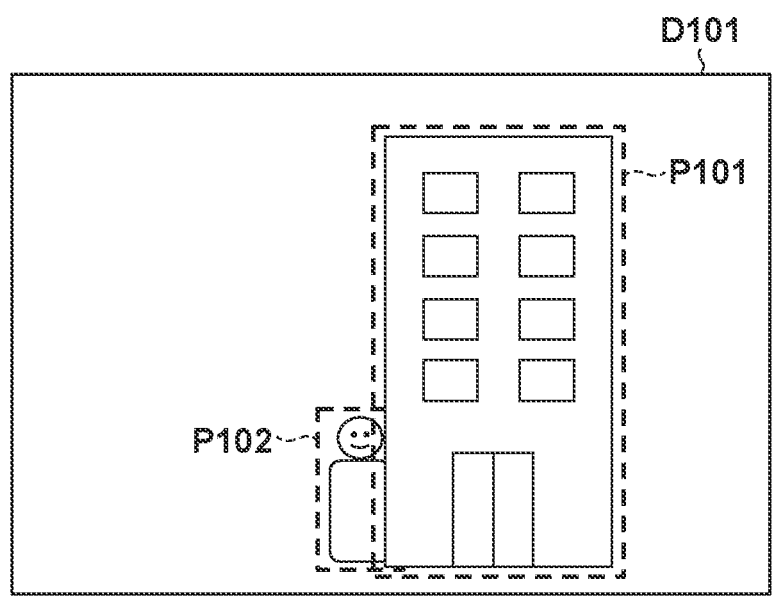
FIG. 4 is a view showing an image D101.

An image D101 shown in FIG. 4 is an (f−1)th frame image (an image obtained a frame after the image D1 of FIG. 3), and an object region P102 of a human body and an object region P101 of a building are detected from the image D101. Object information including an attribute "human body" of the object in the object region P102 and information (for example, the coordinate positions of the upper left corner and the lower right corner of the object region P102) for specifying the object region P102 in the image D101 is generated for the object region P102 of the human body. In a similar manner, object information including an attribute "building" of the object in the object region P101 and information (for example, the coordinate positions of the upper left corner and the lower right corner of the object region P101) for specifying the object region P101 in the image D101 is generated for the object region P101 of the building. As shown in FIG. 4, in the image D101, the human body has moved behind the building from the state shown in the image D1, and human body and the building overlap.

When the pieces of object information of the human body and the building in the image D101 are obtained from the region division unit A1005, the comparison unit A1006 determines the front-and-back relationship and the relationship of the concealment between the human body and the building by using the pieces of object information of the human body and the building in the image D101 and the "pieces of object information of the human body and the building in the image D1" stored in the storage unit A1008. As shown in FIGS. 3 and 4, the object region P102 of the human body in the image D101 is adjacent to the object region P101 of the building, and has a size smaller than the object region P2 of the human body of the preceding frame. This means that an overlap between a part of the human body and the building (the human body is the background object and the building is the foreground object) has occurred because the human body has moved behind the building. Hence, the comparison unit A1006 will determine that "the human body and the building are overlapping (the human body is the background object and the building is the foreground object)" in a case in which the size of the object region P102 of the human body has become smaller than the size of the object region P2 of the human body of the preceding frame in a state in which the object region P102 of the human body is adjacent to the object region P101 of the building. Subsequently, the comparison unit A1006 will add, to the object information of the human body, information (background information) expressing that the human body is "positioned behind the building", and will add, to the object information of the building, information (foreground information) indicating that the building is "positioned in front of the human body".

Figure 5:
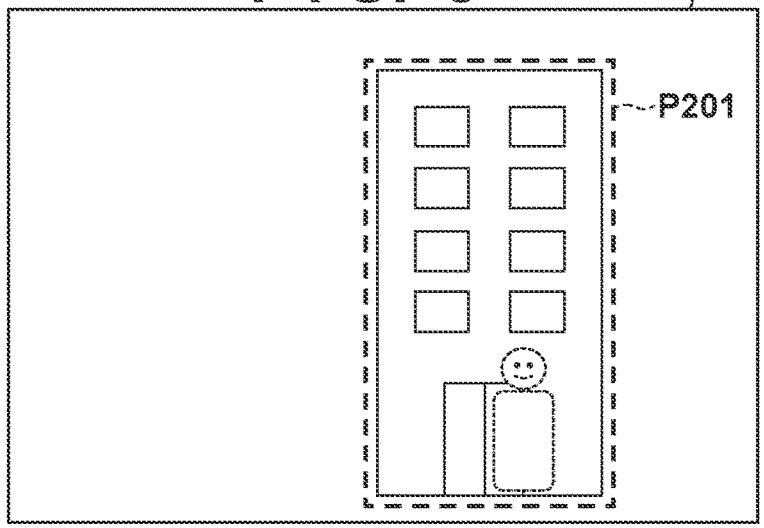
FIG. 5 is a view showing an image D201.

An image D201 shown in FIG. 5 is an fth frame image (an image obtained a frame after the image D101 of FIG. 4). In the image D201, since the human body is concealed by the building (the human body concealed by the building is indicated by dotted lines), the object region of the human body is not detected although an object region P201 of the building is detected. The object region of the human body will not be detected in a similar manner either in a case in which the human body is not completely concealed by the building, but is not detected as a human body from the image (or in a case in which the detection accuracy is less than a threshold). Hence, the object information of the human body is not generated, and the object information including the attribute "building" of the object in the object region P201 and the information (for example, the coordinate position of the upper left corner and the coordinate position of the lower right corner of the object region P201) for specifying the object region P201 in the image D201 is generated for the object region P201 of the building.

If comparison unit A1006 cannot detect, in the image D201, the object region of the human body that had been determined to be in a state of overlap with (be positioned behind) the building in the image D101, the comparison unit determines that "the human body has been concealed by the building (the human body is the background object and the building is the foreground object)". In a case in which it is determined that "the human body has been concealed by the building (the human body is the background object and the building is the foreground object)", the comparison unit A1006 adds foreground information indicating that the building is "positioned in front of the human body (the human body is positioned behind the building)" to the object information of the building.

In this manner, while the size (area) of the object region of one object has decreased in accordance with the elapse of time in a state in which the object region of the object is adjacent to the object region of another object, the comparison unit A1006 will add the background information indicating that the object is "positioned behind the other object" to the object information of the object and add the foreground information indicating that the other object is "positioned in front of the object" to the object information of the other object. Subsequently, when the object region of the object is not detected from the image of the current frame after being detected up to the image of the immediately preceding frame while the size of the object region of the object has been decreasing in accordance with the elapse of time, the comparison unit A1006 will determine that the object is concealed by the other object and add the foreground information indicating that the other object is "positioned in front of the object" to the object information of the other object.

Note that the method used to determine the front-and-back relationship and the relationship of the concealment between overlapping objects in the image of the current frame is not limited to that described above, and various kinds of methods are applicable. Also, the information expressing an overlapping object and that expressing an object in a relationship of concealment and the mode of managing these pieces of information are not limited to those described in the above example.

In a case in which a human body, which was concealed by an object and could not be detected until this current frame, is detected in a state adjacent to the object in the current frame, a human body discrimination unit A1007 associates the object information of the human body that was concealed by the object and could not be detected with the object information of the human body detected in a state adjacent to the object in the current frame. The operation of the human body discrimination unit A1007 will be described next with reference to the more specific examples shown in FIGS. 5 and 6.

Figure 6:
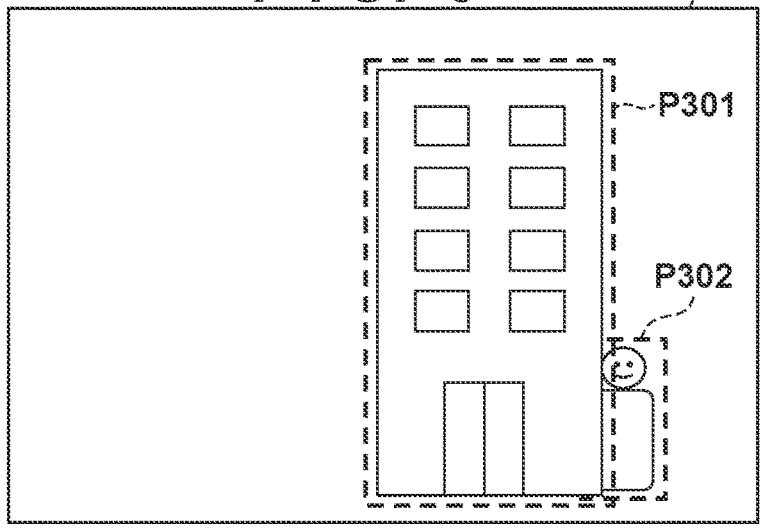
FIG. 6 is a view showing an image D301.

An image D301 shown in FIG. 6 is an (f+1)th frame image (an image obtained a frame after the image D201 of FIG. 5). Since the human body, which had been concealed by the building in the image D201, has appeared from behind the building in the image D301, an object region P302 of the human body has been detected in state in which it is adjacent to an object region P301 of the building. Object information including the attribute "human body" of the object in the object region P302 and the information (for example, the coordinate position of the upper left corner and the coordinate position of the lower right corner of the object region P302) for specifying the object region P302 in the image D301 is generated for the object region P302 of the human body. In a similar manner, object information including the attribute "building" of the object in the object region P301 and the information (for example, the coordinate position of the upper left corner and the coordinate position of the lower right corner of the object region P301) for specifying the object region P301 in the image D301 is generated for the object region P301 of the building.

Assume that foreground information indicating that the building is "positioned in front of a human body A" has been added to the object information of the building in the image D201 and that the object region P302 of the human body has been detected adjacent to the object region P301 of the building in the image D301. At this time, the human body discrimination unit A1007 will determine that the human body A has appeared from behind the building in the (f+1)th frame and associate the object information of the human body A with the object information of the human body corresponding to the object region P302 detected in the image D301. Note that this association will not be performed in a case in which the foreground information indicating that the building is "positioned in front of the human body A" has not been added to the object information of the building in the image D201 or in a case in which the object region P302 of the human body is detected in a state in which the object region P302 of the human body is not adjacent to the object region P301 of the building in the image D301.

The storage unit A1008 stores the object information of each object in each past frame image (the object information obtained by each functional unit of the human body tracking apparatus A1002 for each past frame).

A determination unit A1009 determines whether object information that has been added with the foreground information indicating that an object is "positioned in front of a human body" is present among the pieces of object information of the image of the current frame.

If it is determined that a piece of object information that has been added with the foreground information indicating that an object is "positioned in front of a human body" is present among the pieces of object information of the image of the current frame, the discrimination unit A1010 determines the attribute of the object indicated in the object information is a predetermined attribute (for example, a tree, a utility pole, a traffic light, or a fence). That is, the discrimination unit A1010 determines whether the object, which has a human body positioned behind it in the current frame, is a predetermined object (for example, a tree, a utility pole, a traffic light, or a fence). Note that in a case in which the attribute of the object is a "building" and the size of the region of this object is smaller than a predetermined size, the attribute may be determined to be the above-described predetermined attribute. However, it is preferable to make settings so that the attribute of the object will be determined to be the above-described predetermined attribute only when it has changed from a state in which the region of the "building" and the region of the human body are adjacent to each other as shown in FIG. 4 to a state in which the human body is not detected. This is because it can be considered that the human body has entered the building when the state changes from a state in which the region of the "building" and the region of the human body overlap to a state in which the human body is not detected.

The discrimination unit A1010 will delete the foreground information from the object information when the attribute of the object, indicated by the object information which has been added with the foreground information expressing that the object is "positioned in front of the human body", is not a predetermined attribute.

A determination unit A1011 sets, as a target object, an object (to be the foreground object) corresponding to the object information, which has been added with the foreground information, indicating that the object is "positioned in front of the human body". The determination unit A1011 determines whether the time that has elapsed since the foreground information was initially added to the object information of the target object is equal to or less than a predetermined time. In the example shown by FIGS. 3 to 5, it is determined whether the time that has elapsed since the human body and the building have overlapped is equal to or less than the predetermined time. If the elapsed time exceeds the predetermined time as a result of this determination, the determination unit A1011 will delete the foreground information indicating that the object "is positioned in front of the human body" from the object information to which the foreground information has been added. The determination unit A1011 measures the elapsed time. By executing control in this manner, it is possible to continue the human body tracking processing until a predetermined time has elapsed in a case in which an object of a predetermined attribute is positioned in front of the human body, and it is possible to immediately end the human body tracking processing in a case in which an object other than the object of the predetermined attribute is positioned in front of the human body. However, the human body tracking processing may be continued for about a few seconds even in a case in which an object other than the object of the predetermined attribute is positioned in front of the human body. However, assume that the duration of time in which the processing will be continued will be shorter than the predetermined time described above.

A generation unit A1012 performs human body tracking processing on the image of the current frame by using the pieces of object information of the current frame ultimately obtained by the region division unit A1005, the comparison unit A1006, the human body discrimination unit A1007, the discrimination unit A1010, and the determination unit A1011. The "human body tracking processing on the image of the current frame" is processing executed to notify the user of the region of the human body on the current image frame, and the "human body tracking processing on the image of the current frame" is not limited to specific processing as long as a similar objective can be achieved.

For example, if the object region of the human body has been detected in the image of the current frame, the object region of the human body in the image of the current frame is specified by using "information for specifying the object region of the human body in the image of the current frame" included in the object information of that human body. Subsequently, the frame of the specified object region is drawn on the image of the current frame.

On the other hand, assume a case in which the object region of the human body cannot be obtained from the image of the current frame because the human body is hidden by an object and the foreground information added to the object information of the object indicates that the object is "positioned in front of the human body A". In this case, the object region of the human body in the image of the current frame is specified by using the "information for specifying the object region of the human body in the image of the current frame" included in the object information of the human body A. Subsequently, the frame of the specified object region is drawn on the image of the current frame.

In this case, the human body tracking processing cannot be performed if the foreground information of the object is deleted because the human body hidden behind the object will not be able to be specified. This embodiment will switch between continuation and completion of the tracking processing by deleting/not deleting the foreground information of the object.

Note that in addition to or instead of the frame, information (for example, a recognition result (for example, a facial recognition result such as sex, age, and the like) obtained for the object region of the human body) related to the object region of the human body may be drawn in the image of the current frame.

That is, in this embodiment, in a case in which the attribute of an object, indicated by object information which has been added with foreground information indicating that the object is "positioned in front of a human body", is a predetermined attribute and the elapsed time is equal to or less than a predetermined time, the tracking processing can be continued because the foreground information will not be deleted. On the other hand, in a case in which the attribute of an object, indicated by object information that has been added with foreground information indicating that the object is "positioned in front of a human body", is not a predetermined attribute or in a case in which the elapsed time exceeds a predetermined time, the tracking processing will be ended because the processing cannot be performed due to the deletion of the foreground information.

Figure 7:
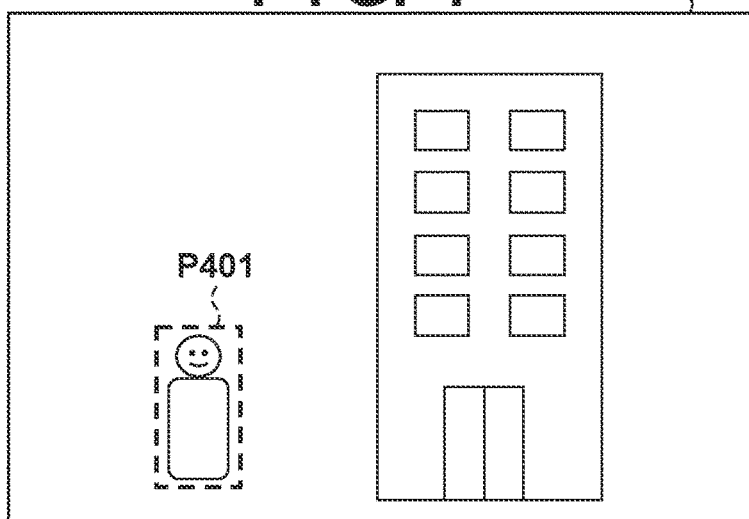
FIG. 7 is a view showing an example of an image of a current frame displayed by a display apparatus A1003.

A video output unit A1013 outputs the image of the current frame obtained from the generation unit A1012 to the display apparatus A1003. FIG. 7 shows an example of the image of the current frame displayed by the display apparatus A1003. A frame (human body tracking frame) has been added to an object region P401 of the human body by the human body tracking processing in an image D401 of the current frame shown in FIG. 7.

Note that the destination to which the video output unit A1013 outputs the image of the current frame is not limited to the display apparatus A1003. For example, the video output unit A1013 may output the image of the current frame to an external terminal device, an external server apparatus, an external or internal memory device.

Figure 2:
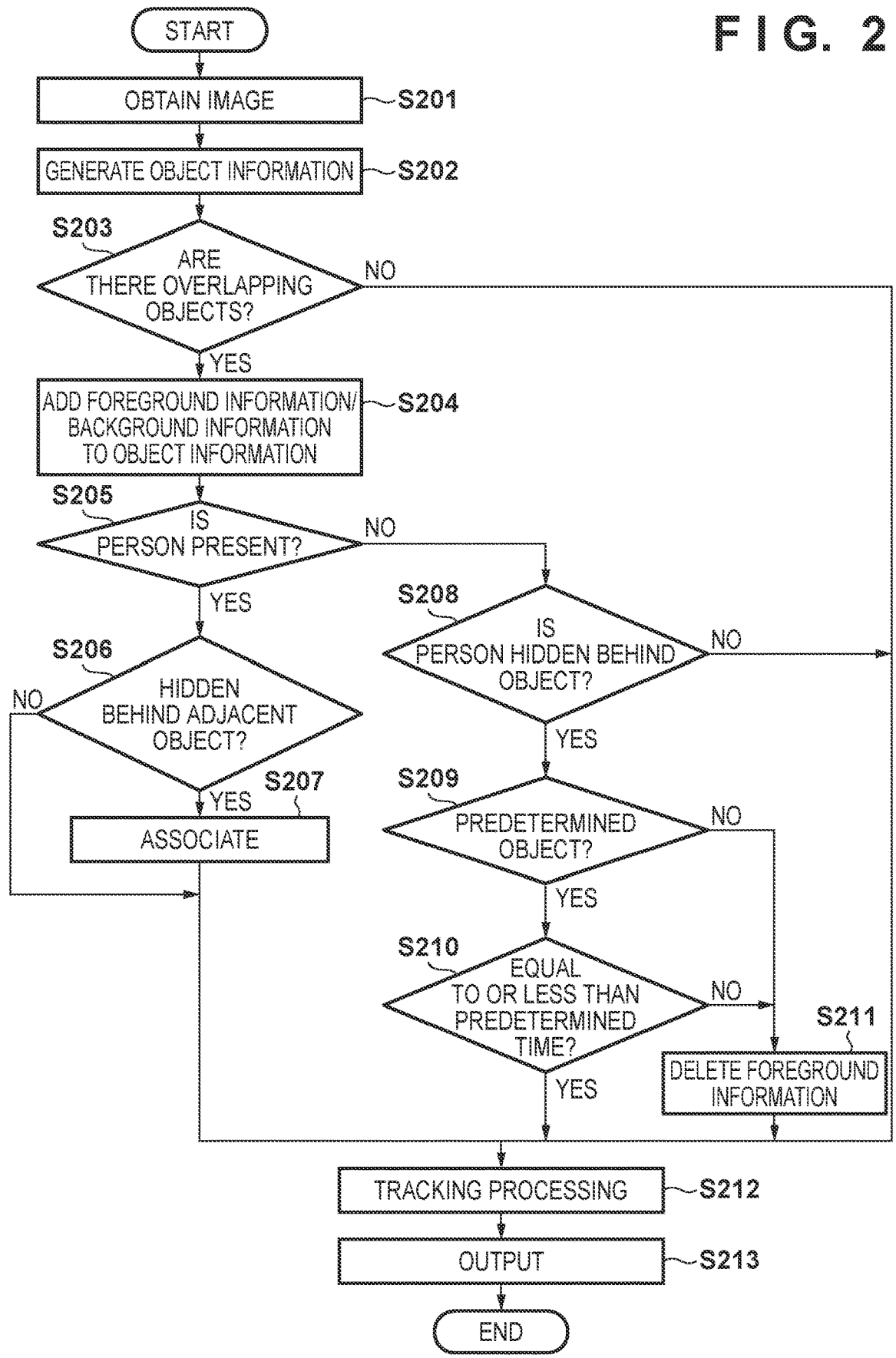
FIG. 2 is a flowchart of processing performed by a human body tracking apparatus A1002.

The processing performed by the human body tracking apparatus A1002 on an image of one frame will be described next with reference to the flowchart of this processing shown in FIG. 2. The human body tracking apparatus A1002 performs the processing according to the flowchart of FIG. 2 on the image of each frame obtained from the video obtainment apparatus A1001. In addition, the condition for ending the processing according to the flowchart of FIG. 2 is not limited to a specific condition and may be, for example, the fact that "the user has turned off the power switch (not shown) of the human body tracking apparatus A1002".

In step S201, the video obtainment unit A1004 obtains an image (the image of the current frame) supplied from the video obtainment apparatus A1001. In step S202, the region division unit A1005 detects the object region of each object in the image of the current frame and generates the object information for each object region.

In step S203, the comparison unit A1006 determines whether overlapping objects are present in the image of the current frame. As result of this determination, the process advances to step S204 if overlapping objects are present in the image of the current frame. If overlapping objects are not present in the image of the current frame, the process advances to step S212.

The comparison unit A1006 will determine that overlapping objects are present in the image of the current frame when the size of the object region of an object in the image of the current frame decreases from the size of the object region of the object in the preceding frame in a state in which the object region of the object is adjacent to the object region of another object. At this time, in step S204, the comparison unit A1006 will add the background information indicating that the object is "positioned behind the other object" to the object information of the object and add the foreground information indicating that the other object is "positioned in front of the object" to the object information of the other object.

Also, in a case in which the object region of the other object, which has been determined to be in a state of overlap with the object up to the preceding frame, cannot be detected from the image of the current frame, the comparison unit A1006 will determine that overlapping objects are present in the image of the current frame. At this time, in step S204, the comparison unit A1006 will add the foreground information indicating that the object is "positioned in front of the other object" to the object information of the object.

In step S205, the human body discrimination unit A1007 determines whether the object information (object information in which "human body" is indicated as the attribute) of a human body is present among the pieces of object information generated in step S202. As a result of this determination, the process will advance to step S206 if the object information of the human body is present among the pieces of object information generated in step S202. If the object information of the human body is not present among the pieces of object information generated in step S202, the process advances to step S208.

In step S206, the human body discrimination unit A1007 determines whether a human body that had been concealed by an object and could not be detected until the current frame has been detected in the current frame in a state adjacent to the object. As a result of this determination, if the human body that had been concealed by the object and could not be detected until the current frame has been detected in the current frame in a state adjacent to the object, the process advances to step S207. On the other hand, if the human body that had been concealed by the object and could not be detected until the image of the current frame has not been detected in the image of the current frame in a state adjacent to the object, the process advances to step S212.

In step S207, the human body discrimination unit A1007 associates the object information of the human body that had been concealed by the object and could not be detected until the current frame with the object information of the human body detected in a state adjacent to the object in the current frame.

In step S208, the determination unit A1009 determines whether object information that has been added with the foreground information indicating that an object is "positioned in front of the human body" is present among the pieces of object information of the image of the current frame. As a result of this determination, if the object information that has been added with the foreground information indicating that an object is "positioned in front of the human body" is present among the pieces of object information of the image of the current frame, the process advances to step S209. On the other hand, if the object information that has been added with the foreground information indicating that an object is "positioned in front of the human body" is not present among the pieces of object information of the image of the current frame, the process advances to step S212.

In step S209, the discrimination unit A1010 determines whether the attribute of the object indicated by the object information that has been added with the foreground information indicating that an object is "positioned in front of the human body", among the pieces of object information of the image of the current frame, is a predetermined attribute. As a result of this determination, if the attribute of the object indicated by the object information that has been added with the foreground information indicating that an object is "positioned in front of the human body", among the pieces of object information of the image of the current frame, is a predetermined attribute, the process advances to step S210. On the other hand, if the attribute of the object indicated by the object information that has been added with the foreground information indicating that an object is "positioned in front of the human body", among the pieces of object information of the image of the current frame, is not a predetermined attribute, the process advances to step S211.

In step S210, the determination unit A1011 sets, as a target object, the object corresponding to the object information that has been added with the foreground information indicating that an object is "positioned in front of the human body". The determination unit A1011 then determines whether the time elapsed since the foreground information was initially added to the object information of the target object is equal to or less than a predetermined time. As a result of this determination, if the elapsed time exceeds the predetermined time, the process advances to step S211. If the elapsed time is equal to or less than the predetermined time, the process advances to step S212. In step S211, the determination unit A1011 deletes the foreground information indicating that the object is "positioned in front of the human body" from the object information added with the foreground information.

In step S212, the generation unit A1012 performs human body tracking processing on the image of the current frame by using the pieces of the object information of the current frame ultimately obtained by the region division unit A1005, the comparison unit A1006, the human body discrimination unit A1007, the discrimination unit A1010, and the determination unit A1011. Note that, as described above, the human body tracking processing is not performed on the human body that is positioned behind the object corresponding to the object information from which the foreground information has been deleted. In step S213, the video output unit A1013 outputs the image of the current frame generated by the generation unit A1012 to the display apparatus A1003.

As described above, according to this embodiment, in a case in which a human body becomes invisible because it has become hidden behind an object of a predetermined attribute such as a tree, a utility pole, a traffic light, a fence, or the like, it is possible to control the tracking processing so that the processing can be continued or ended in accordance with the length of time in which the human body is hidden behind the object.

Second Embodiment

Assume that differences in the arrangement from the first embodiment will be described in each of the following embodiments including this embodiment, and that the arrangement is similar to that of the first embodiment unless particularly mentioned. An example of the functional arrangement of a human body tracking system according to this embodiment will be described with reference to the block diagram of FIG. 8.

Figure 8:
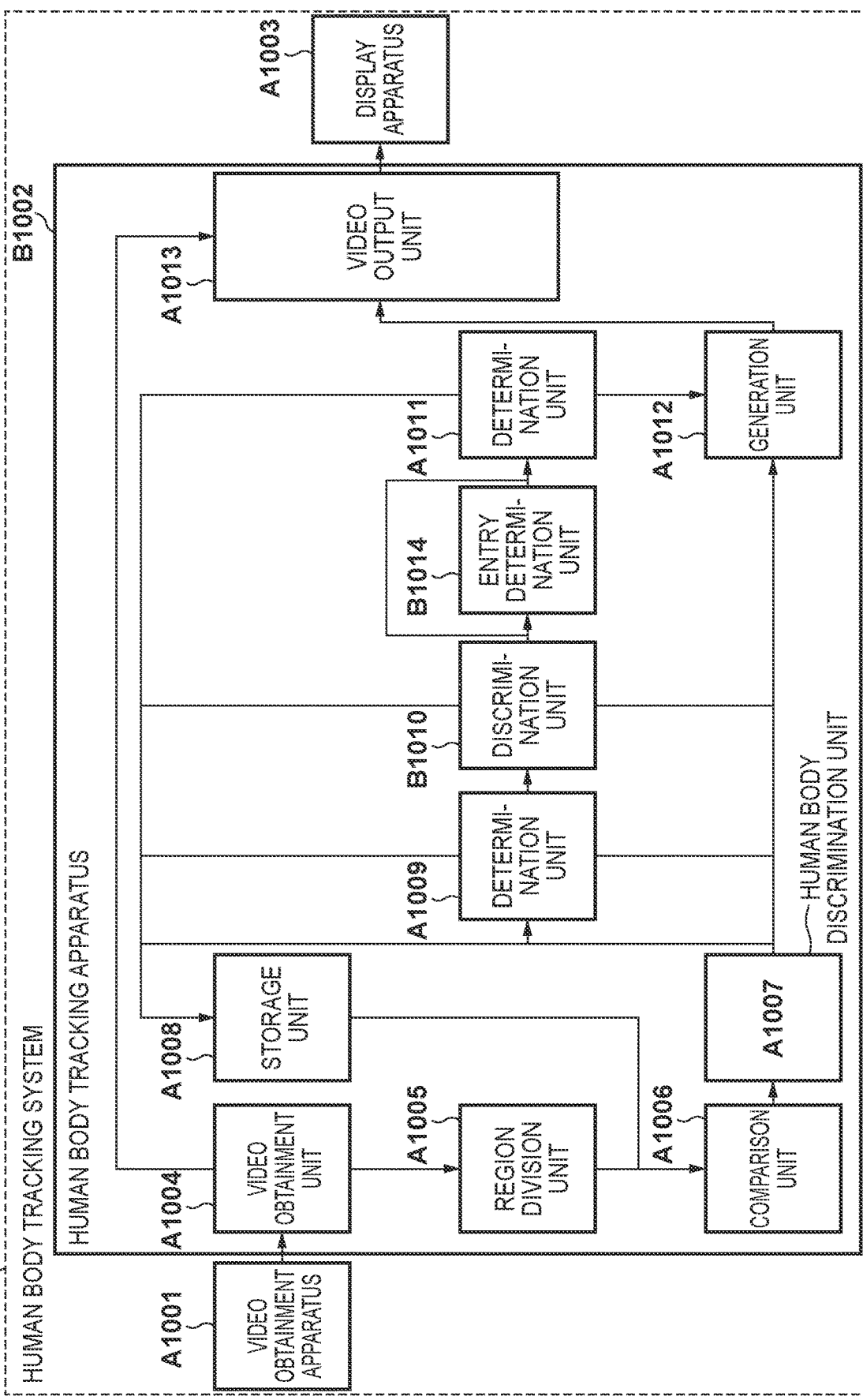
FIG. 8 is a block diagram showing an example of the functional arrangement of a human body tracking system.

As shown in FIG. 8, a human body tracking system B1000 according to this embodiment has an arrangement in which a human body tracking apparatus A1002 of a human body tracking system A1000 according to the first embodiment has been replaced by a human body tracking apparatus B1002. The human body tracking apparatus B1002 is an apparatus in which a discrimination unit A1010 of the human body tracking apparatus A1002 has been replaced by a discrimination unit B1010 and an entry determination unit B1014 has been added.

The discrimination unit B1010 determines whether object information (object information including "human body enterable structure" as an attribute) of a "human body enterable structure" (for example, a building, a vehicle, or the like) is present among the pieces of object information obtained from the image of the current frame.

The entry determination unit B1014 determines whether the human body has entered a structure in the current frame. For example, assume that up to this current frame, the object region of the human body and the object region of the structure have overlapped in a state in which "the human body is the foreground object and the structure is the background object", and that the object region of the human body cannot be detected (the structure has become the foreground object and the human body has become the background object) in the current frame. In such a case, the entry determination unit B1014 will determine that the human body has entered the structure in the current frame. Subsequently, upon determining that the human body has entered the structure in the current frame, the entry determination unit B1014 deletes the foreground information added to the object information of the structure.

Note that, in this embodiment, the object region of the human body and the object region of the structure overlap in a state in which "the human body is the foreground object and the structure is the background object" up to the current frame, and it will be determined that "the structure is the foreground object and the human body is the background object" in a case in which the object region of the human body cannot be detected from the image of the current frame.

Figure 9:
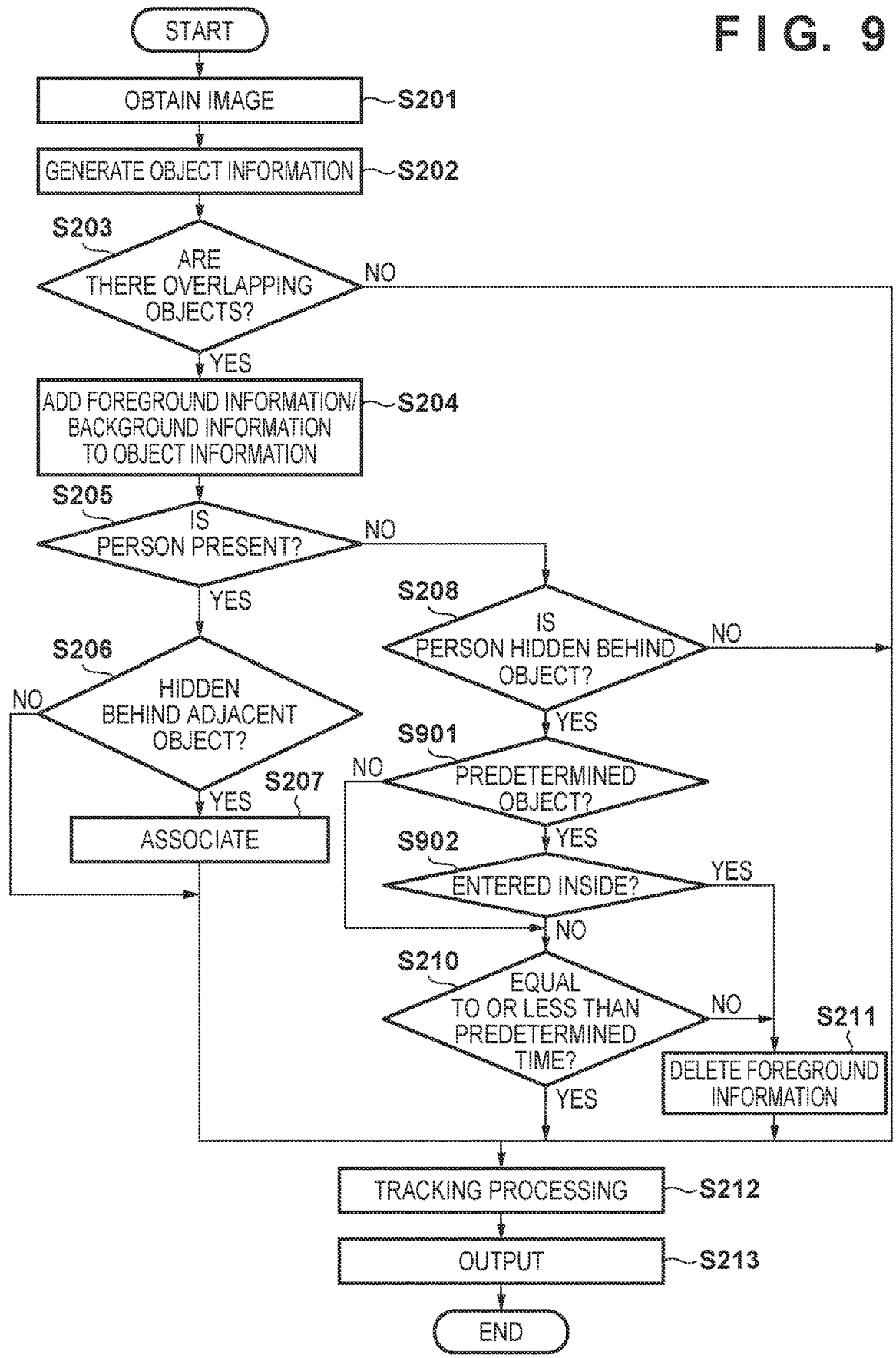
FIG. 9 is a flowchart of processing performed by a human body tracking apparatus B1002.

Processing performed by the human body tracking apparatus B1002 on an image of one frame will be described next with reference to the flowchart of the processing shown in FIG. 9. The human body tracking apparatus B1002 performs processing according to the flowchart of FIG. 9 on the image of each frame obtained from a video obtainment apparatus A1001. Also, the condition to end the processing according to the flowchart of FIG. 9 is not limited to a specific condition and may be, for example, the fact that "a user has turned off the power switch (not shown) of the human body tracking apparatus B1002".

In step S901, the discrimination unit B1010 determines whether the object information (object information including a "human body enterable structure" as an attribute") of a "human body enterable structure" (for example, a building, a vehicle, or the like) is present among the pieces of object information obtained from the image of the current frame. As a result of this determination, if the object information of the "human body enterable structure" is present among the pieces of object information obtained from the image of the current frame, the process advances to step S902. On the other hand, if the object information of the "human body enterable structure" is not present among the pieces of object information obtained from the image of the current frame, the process advances to step S210.

In step S902, the entry determination unit B1014 determines whether the human body has entered the building in the current frame. As a result of this determination, if it is determined that the human body has entered the structure in the current frame, the process advances to step S211. On the other hand, if it is determined that the human body has not entered the structure in the current frame, the process advances to step S210.

In this manner, according to this embodiment, in a case in which the human body has entered a structure such as a building or a vehicle and is not visible for a long time, the determination to end the tracking processing can be made without requiring more time than necessary to make this determination.

Third Embodiment

Figure 10:
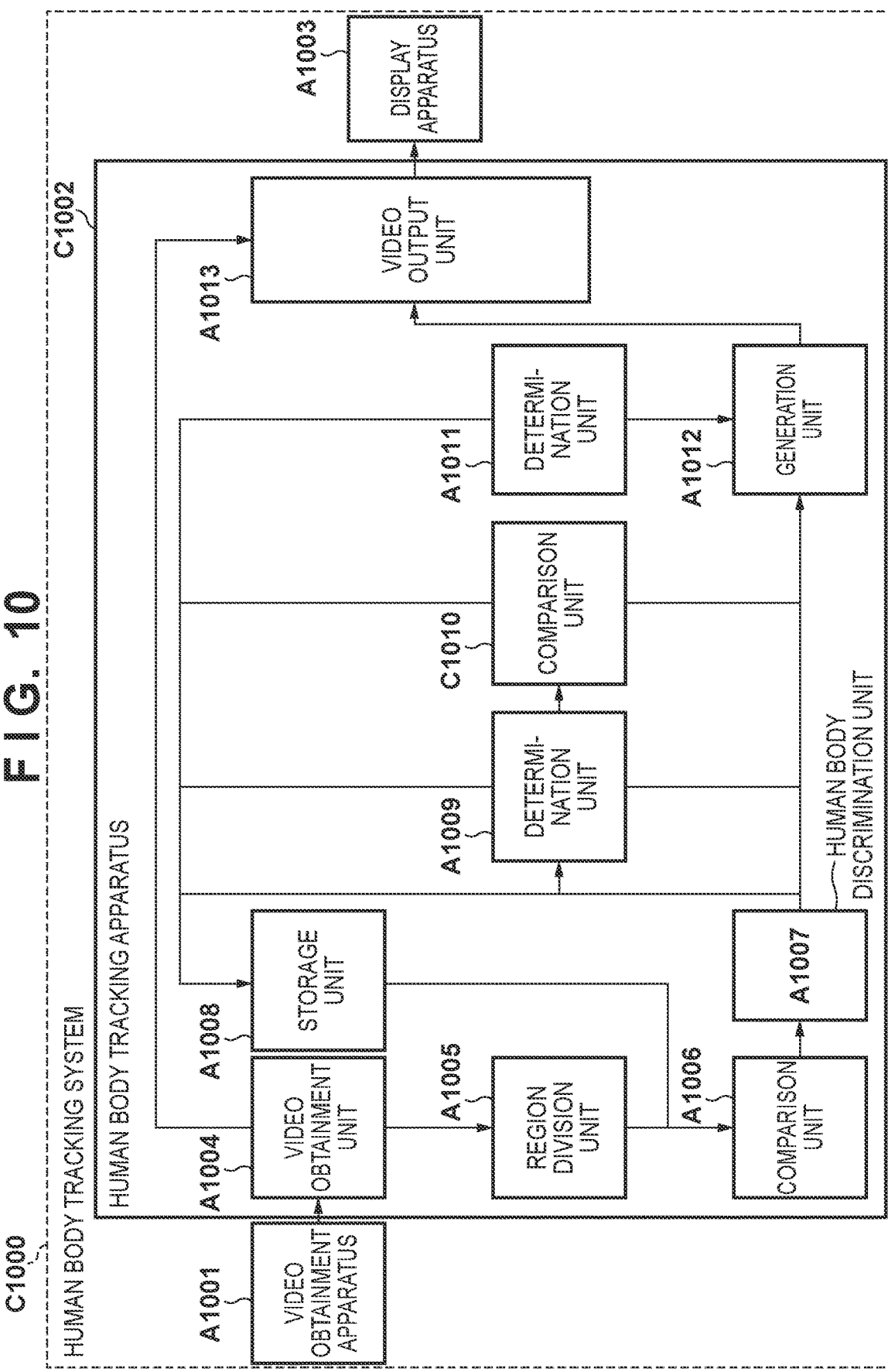
FIG. 10 is a block diagram of an example of the functional arrangement of a human body tracking system.

An example of the functional arrangement of a human body tracking system according to this embodiment will be described with reference to the block diagram of FIG. 10. As shown in FIG. 10, a human body tracking system C1000 according to this embodiment has an arrangement in which a human body tracking apparatus A1002 of a human body tracking system A1000 according to the first embodiment has been replaced by a human body tracking apparatus C1002. The human tracking apparatus C1002 is an apparatus in which a discrimination unit A1010 of the human body tracking apparatus A1002 has been replaced by a comparison unit C1010.

When a piece of object information that has been added with the foreground information indicating that an object is "positioned in front of a person A" is present among the pieces of the object information of the image of the current frame, the comparison unit C1010 specifies a size S1 (area) of the object region from the object information. For example, the comparison unit C1010 uses "information for specifying an object region in an image" included in the object information to specify the size of the object region. The comparison unit C1010 also specifies a size S2 (area) of the object region of the person A in a similar manner from the object information of the person A. The comparison unit C1010 subsequently obtains a ratio r of S1 with respect to S2, and deletes the above-described foreground information or sets, in accordance with the obtained ratio r, the above-described predetermined time (a threshold θ) which is the target of magnitude comparison with the above-described elapsed time. A determination unit A1011 performs the magnitude comparison with the above-described elapsed time by using, as the predetermined time, the predetermined time set by the comparison unit C1010.

Figure 12:
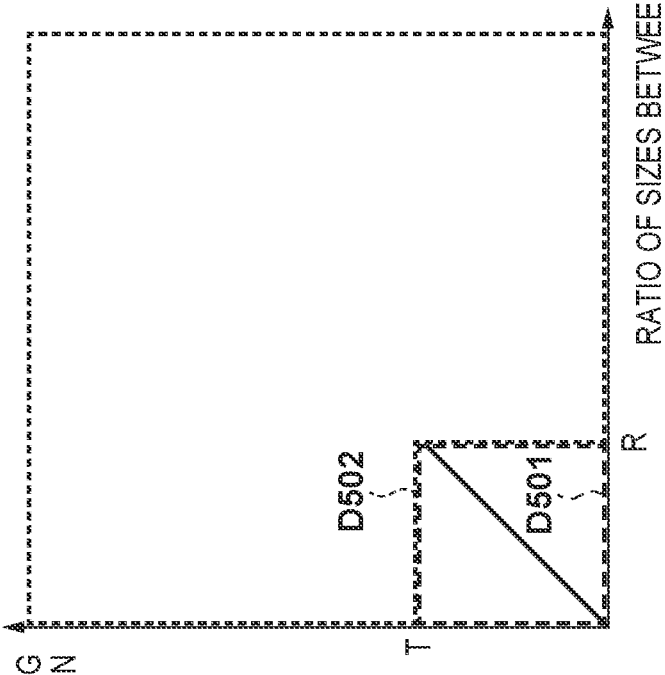
FIG. 12 is a graph showing the relationship between a ratio r and a threshold θ.

The relationship of the ratio r and the threshold θ will be described with reference to the example shown in FIG. 12. In FIG. 12, the ordinate indicates the threshold (the threshold of the tracking continuation determination), and the abscissa indicates the ratio r (the ratio of the sizes between objects). In an area D501 (an area in which the ratio r is R or less and the threshold is T or less), the possibility that an object hiding the person is a tree, a car, or the like, is high, and the possibility that the person will remain behind the object for a long time is low. Hence, in a case in which r≤R, the threshold θ will be set to be proportional to the ratio r. On the other hand, in an area D502 (an area in which the ratio r is greater than R, and the threshold is greater than T), the possibility that an object hiding the person is a structure larger than the person is high, and the possibility that the person will remain behind the object for a long time is high. Hence, in a case in which r>R, the foreground information is deleted from the object information because the tracking processing will be ended without setting the threshold θ.

Figure 11:
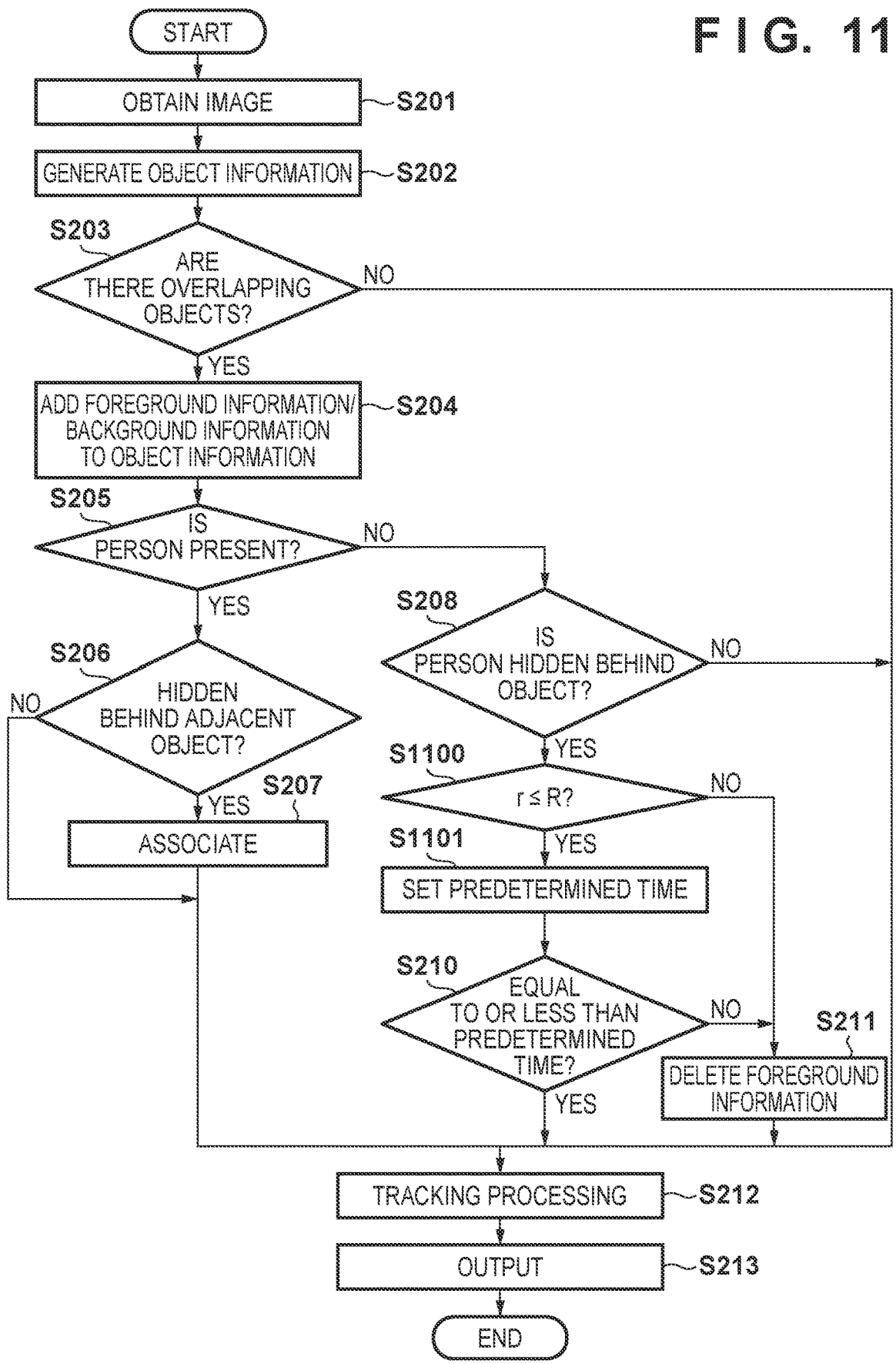
FIG. 11 is a flowchart of processing performed by a human body tracking apparatus C1002.

Processing performed by the human tracking apparatus C1002 on an image of one frame will be described next with reference to the flowchart of the processing shown by FIG. 11. The human tracking apparatus C1002 performs the processing according to the flowchart of FIG. 11 for the image of each frame obtained from a video obtainment apparatus A1001. Also, the condition to end the processing according to the flowchart of FIG. 11 is not limited to a specific condition and may be, for example, the fact that "a user has turned off the power switch (not shown) of the human body tracking apparatus C1002".

In step S1100, the comparison unit C1010 obtains the ratio r and determines whether the ratio r is equal to or less than a predetermined value R. As a result of this determination, if the ratio r is equal to or less than the predetermined value R, the process advances to step S1101. If the ratio r is larger than the predetermined value R, the process advances to step S211. In step S1101, the comparison unit C1010 sets the threshold θ which is proportional to the ratio r as the predetermined time described above.

In this manner, according to this embodiment, even in a case in which a person is hidden behind an object other than a person, the size of the object hiding the person and the size of the person can be compared, and the tracking processing will be ended when it is determined that the size ratio is large and the person may remain behind the object for a long time. On the other hand, the tracking processing will be continued when it is determined that the size of the ratio is small and the person may not remain behind the object for a long time.

Note that as long as the ratio r is a ratio that reflects the ratio of S1 with respect to S2, it need not always be (S1/S2) and can be obtained in various kinds of ways. In addition, it is sufficient for the threshold θ to increase/decrease with respect to the increase/decrease of the ratio r, and the threshold θ need not always be expressed by θ=p×r+q (p, q are constants).

Fourth Embodiment

Figure 13:
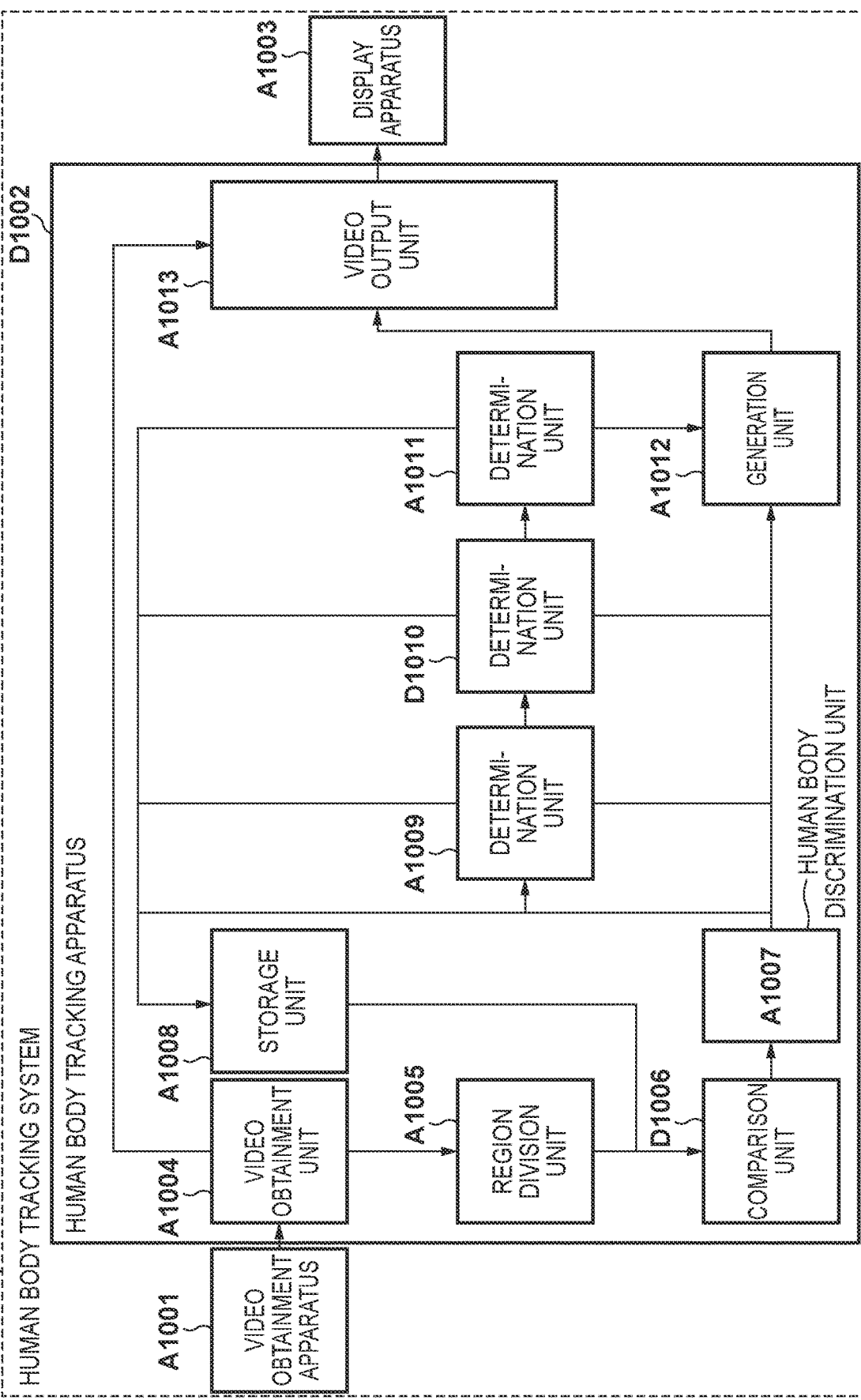
FIG. 13 is a block diagram showing an example of the functional arrangement of a human body tracking system.

An example of the functional arrangement of a human body tracking processing according to this embodiment will be described with reference to the block diagram of FIG. 13. As shown in FIG. 13, a human body tracking system D1000 according to this embodiment has an arrangement in which a human body tracking apparatus A1002 of a human body tracking system A1000 according to the first embodiment has been replaced by a human body tracking apparatus D1002. The human tracking apparatus D1002 is an apparatus in which a comparison unit A1006 of the human body tracking apparatus A1002 has been replaced by a comparison unit D1006 and a discrimination unit A1010 has been replaced by a determination unit D1010.

In addition to the operation of the comparison unit A1006, the comparison unit D1006 performs an operation of collecting, from the current frame and each past frame stored in a storage unit A1008, movement information which is information related to the movement of an object between frames. The operation of the comparison unit D1006 will be described with reference to an example shown in FIGS. 15 to 17.

Figure 15:
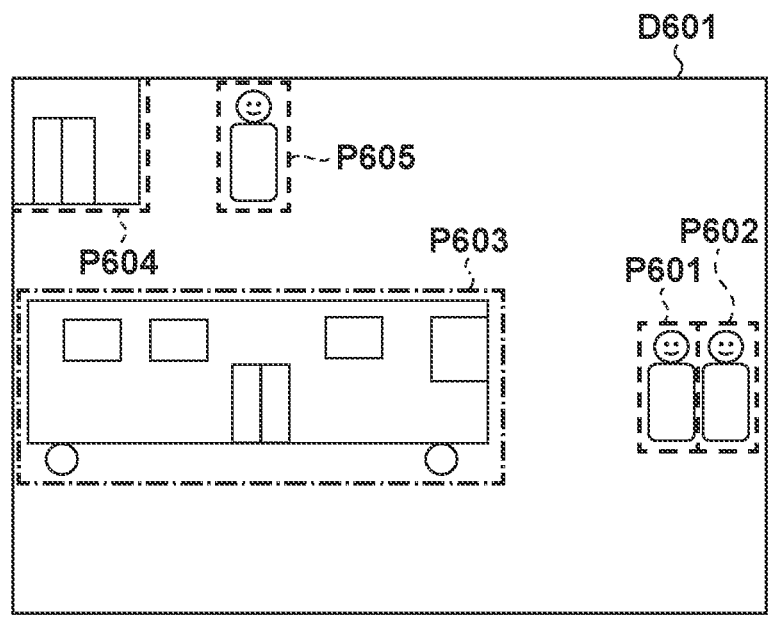
FIG. 15 is a view showing an image D601.
Figure 16:
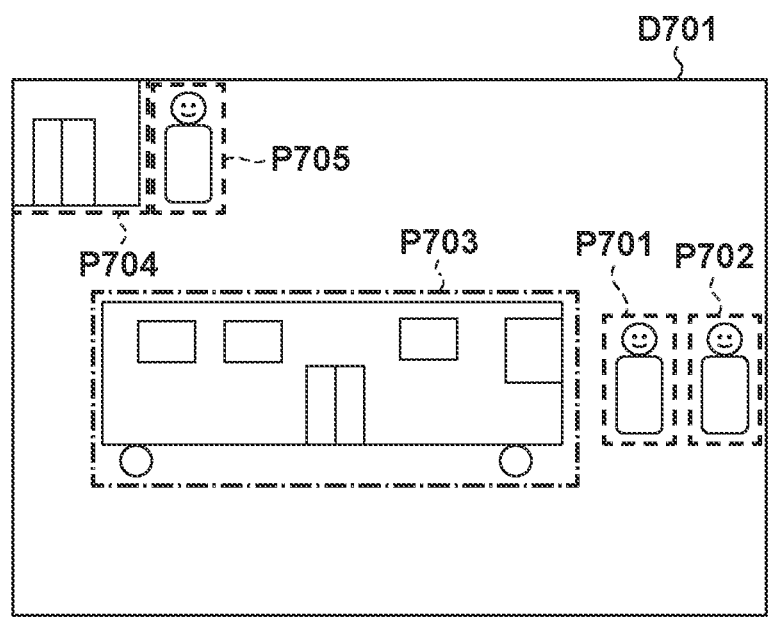
FIG. 16 is a view showing an image D701.
Figures 17, 18:
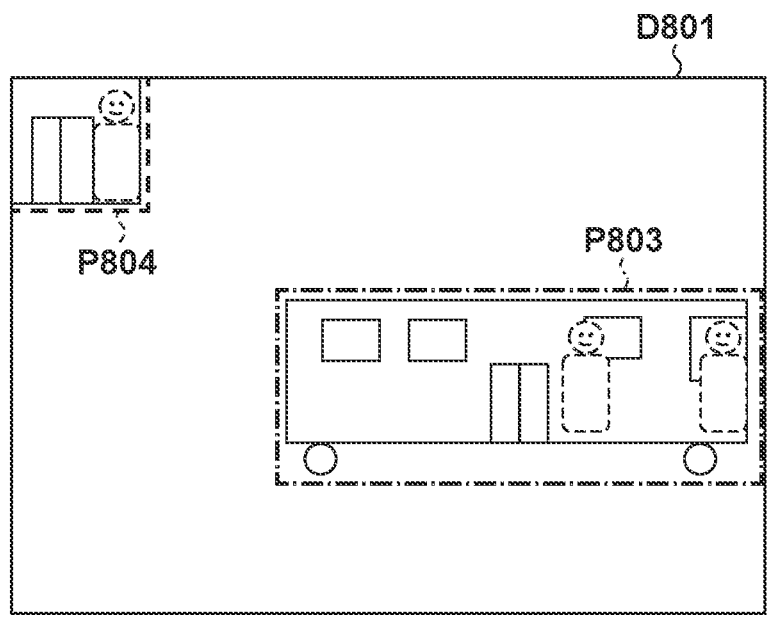
FIG. 17 is a view showing an image D801.
FIG. 18 is a table showing an example of the arrangement of table information.

Assume that an image D601 of FIG. 15 is an image of a frame before an image D701 of FIG. 16, the image D701 of FIG. 16 is an image of a frame before an image D801 of FIG. 17, and the image D801 of FIG. 17 is the image of the current frame.

Comparing the image D601 and the image D701, it can be seen that the position of the object region of the same person (a person A) has changed between an object region P605 and an object region P705, and that the position of the object region of another same person (a person B) has changed between an object region P601 and object region P701. In addition, the position of the object region of the same vehicle has changed between an object region P603 and an object region P703. On the other hand, the position of the object region of yet another same person (a person C) has not changed between an object region P602 and an object region P702, and the position of the object region of the same building has not changed between an object region P604 and an object region P704. The comparison unit D1006 determines the presence/absence of movement of each object between the frames in this manner, and generates, as the movement information, information indicating the presence/absence of movement of each object.

In the image D801, the person A has further moved and is concealed by the building, and the object region of the person A cannot be detected. In a similar manner, in the image D801, the person B and the person C are concealed by the vehicle, and the object regions of the person B and the person C cannot be detected.

In this case, the comparison unit D1006 adds, to the object information of the building positioned in front of the person A, movement information which indicates that "the movement of the person A is 'present', and the movement of the building is 'absent'" and has been obtained by comparing the image D601 and the image D701. The comparison unit D1006 also adds, to the object information of the vehicle positioned in front of the person B and the person C, movement information, which indicates that "the movement of the person B is 'present', the movement of the person C is 'absent', and the movement of the vehicle is 'present'" and has been obtained by comparing the image D601 and the image D701.

The determination unit D1010 determines the content for controlling the human body tracking processing based on the combination of the movement information of each of the object and the human body concealed by the object. At the time of this determination, the determination unit D1010 refers the table information exemplified in FIG. 18.

If the combination indicates that the movement information of the object concealing the human body is "present" and the movement object of the human body is "present", the possibility that the person will be hidden behind the object over a long time is low. Hence, "continue", in which tracking processing performed unlimitedly without measuring the above-described elapsed time, is registered as the determination for this combination in the table information of FIG. 18.

If the combination indicates that the movement information of the object concealing the human body is "present" and the movement information of the human body is "absent", it may be possible that the person is waiting for a vehicle. Hence, "determine based on time that has elapsed since the human body became hidden behind the object", in which whether to perform tracking is determined in accordance with whether the time that has elapsed since the human body became hidden behind the object exceeds a predetermined time (that is, in a manner similar to the first embodiment), is registered as the determination for this combination in the table information of FIG. 18.

If the combination indicates that the movement information of the object concealing the human body is "absent" and the movement information of the human body is "present", the person may be getting into the vehicle, or the like. Hence, "determine based on time that has elapsed since the human body became hidden behind the object", in which whether to perform tracking is determined in accordance with whether the time that has elapsed since the human body became hidden behind the object exceeds a predetermined time (that is, in a manner similar to the first embodiment), is registered as the determination for this combination in the table information of FIG. 18.

If the combination indicates that the movement information of the object concealing the human body is "absent" and the movement information of the human body is "absent", the possibility that the person will remain behind the object is high. Hence, "stop", in which the foreground information of the object will be deleted to end the tracking processing, is registered as the determination for this combination in the table information of FIG. 18.

The determination unit D1010 operates for the combination in which the movement information of the object concealing the human body is "present" and the movement information of the human body is "absent", and the combination in which the movement information of the object concealing the human body is "absent" and the movement information of the human body is "present". Also, the determination unit D1010 deletes the foreground information of an object when the movement information of the corresponding object concealing the human body is "absent" and the movement information of the human body is "absent".

Figure 14:
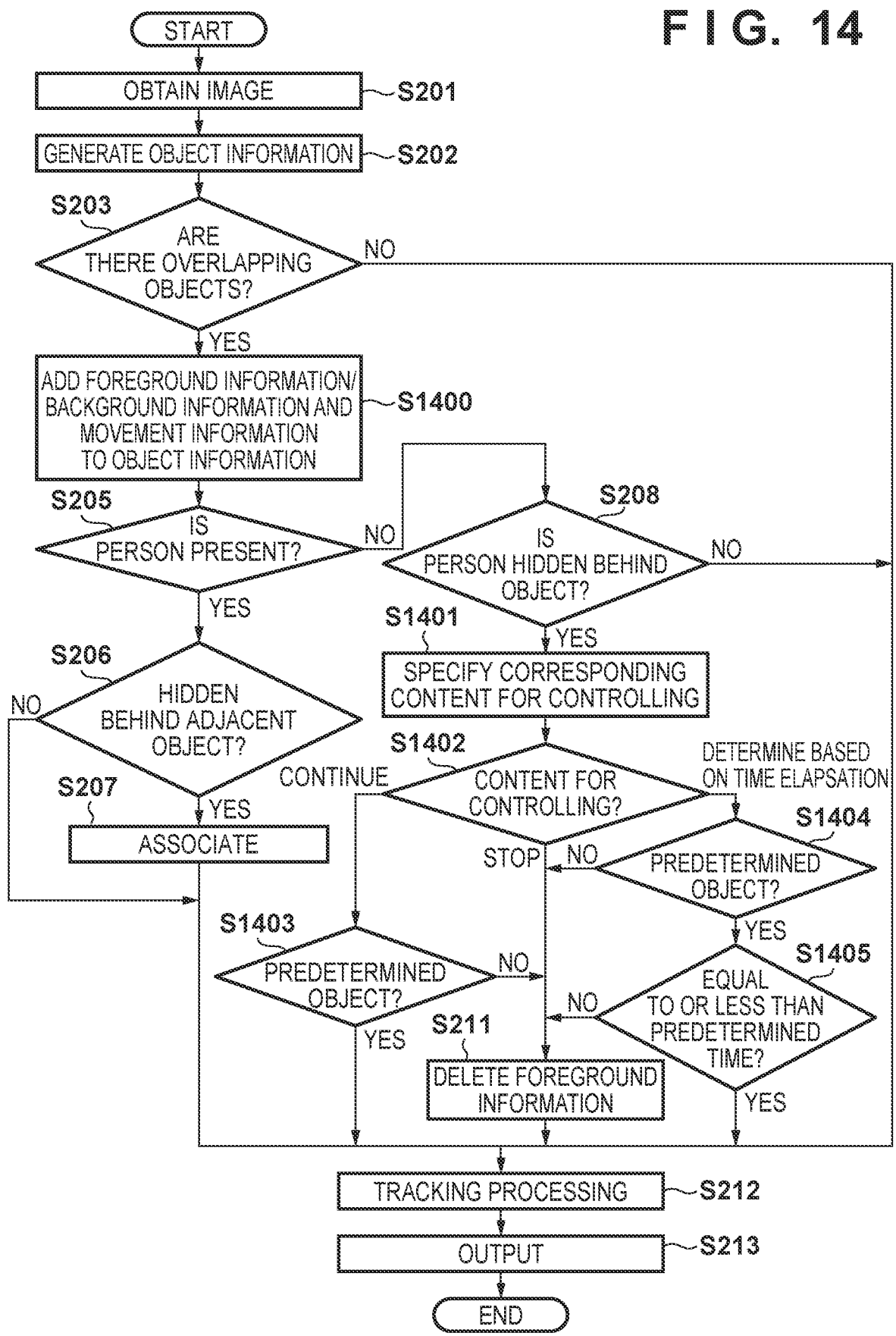
FIG. 14 is a flowchart of processing performed by a human body tracking apparatus D1002.

Processing performed by the human body tracking apparatus D1002 on the image of one frame will be described next with reference to the flowchart of the processing shown in FIG. 14. The human tracking apparatus D1002 performs the processing according to the flowchart of FIG. 14 for the image of each frame obtained from a video obtainment apparatus A1001. Also, the condition to end the processing according to the flowchart of FIG. 14 is not limited to a specific condition and may be, for example, the fact that "a user has turned off the power switch (not shown) of the human body tracking apparatus D1002".

In step S1400, in addition to the operation of the comparison unit A1006, the comparison unit D1006 collects, from the current frame and each past frame stored in the storage unit A1008, the movement information related to the movement of each object between frames and adds the movement information to the corresponding movement information.

In step S1401, the determination unit D1010 specifies, from the table information of FIG. 18, the contents for controlling the tracking processing corresponding to the combination of the movement information of the object concealing the human body and the movement information of the human body.

In step S1402, the determination unit D1010 branches the processing in accordance with the specified contents for controlling the tracking processing. If the specified contents for controlling the tracking processing are "continue", the process advances to step S1403. If the specified contents for controlling the tracking processing are "stop", the process advances to step S211. On the other hand, if the specified contents for controlling the tracking processing are "determine based on time that has elapsed (since the human body became hidden behind the object)", the process advances to step S1404.

Other than the point that the branch destination of the processing is different, steps S1403 and S1404 are processing steps that perform processing similar to the processing of step S209 described above. In addition, other than the point that the branch destination of the processing is different, step S1405 is also a processing step that performs processing similar to the processing of step S210 described above.

In this manner, according to this embodiment, whether tracking processing is to be continued can be determined in accordance with the movement of a person hidden behind an object even in a case in which the person is hidden in an object other than a person.

Fifth Embodiment

Although the functional units shown in FIGS. 1, 8, 10, and 13 may be implemented by hardware, some of the functional units may be implemented by software. For example, the storage unit A1008 may be implemented by a memory, and each functional unit other than this may be implemented by a computer program. In this case, a computer apparatus that includes the storage unit A1008 as a memory and can execute a computer program to implement each functional unit other than the storage unit is applicable to a human body tracking apparatus (A1002, B1002, C1002, or D1002).

Figure 19:
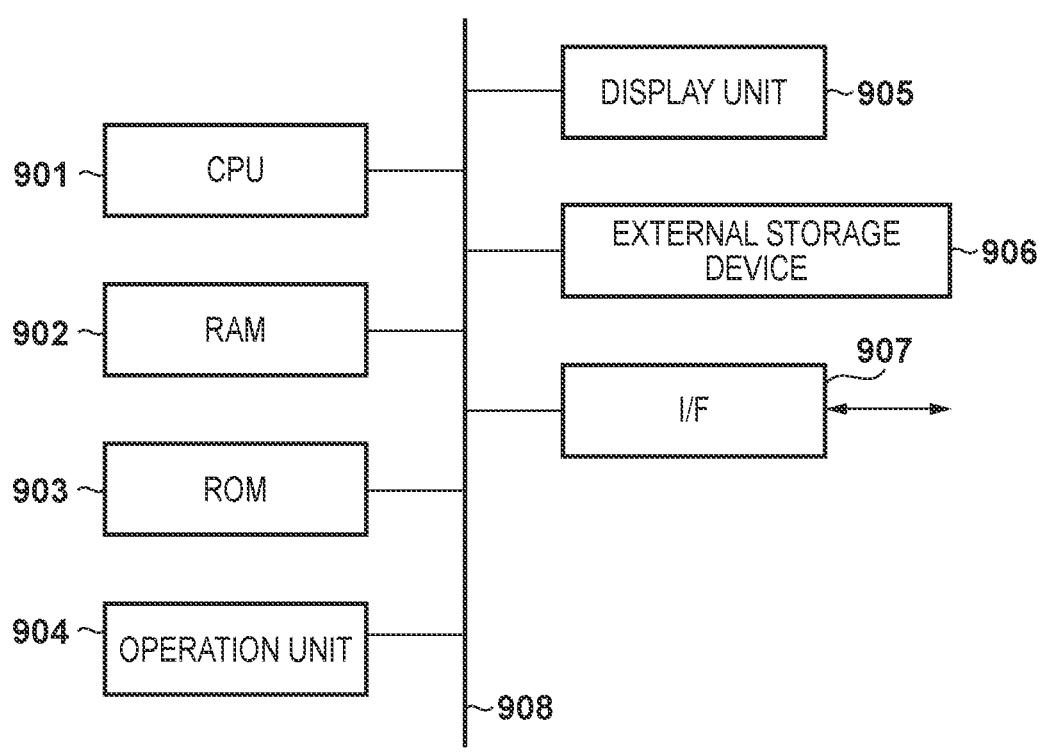
FIG. 19 is a block diagram showing an example of the hardware arrangement of a computer apparatus.

An example of the hardware arrangement of the computer apparatus that is applicable to the human body tracking apparatus (A1002, B1002, C1002, or D1002) will be described with reference to the block diagram of FIG. 19. An apparatus such a PC (personal computer), a tablet terminal apparatus, a smartphone, or the like, can be applied to such computer apparatus.

A CPU 901 executes various kinds of processing by using computer programs and data stored in a RAM 902 and a ROM 903. As a result, the CPU 901 executes or controls each processing described above as that to be performed by the human body tracking apparatus (A1002, B1002, C1002, or D1002) in addition to controlling the overall operation of the computer apparatus.

The RAM 902 includes an area for storing each computer program and data loaded from the ROM 903 or an external storage device 906. The RAM 902 further includes an area for storing data (for example, the image of each frame received from a video obtainment apparatus A1001) received from an external device via an I/F (interface) 907. The RAM 902 also includes a work area used when the CPU 901 is to execute the various kinds of processing. In this manner, the RAM 902 can appropriately provide various kinds of areas. The ROM 903 stores the setting data and the activation program of the computer apparatus.

An operation unit 904 is formed by user interfaces such as a keyboard, a mouse, a touch panel, and the like, and a user can operate the operation unit to input various kinds of instructions to the CPU 901.

A display unit 905 is formed by a liquid crystal screen, a touch panel, or the like, and can display an image or characters to display the processing result of the CPU 901. Note that the display unit 905 may be a projection device such as a projector that projects images and characters.

The external storage device 906 is a large-capacity information storage device represented by a hard disk drive device. The external storage device 906 stores an OS (Operating System) and computer programs to be executed by the CPU 901 to implement the functions of the functional units excluding the storage unit A1008 shown in FIGS. 1, 8, 10, and 13. In addition, the external storage device 906 stores information (such as a predetermined time, a predetermined value, table information, and the like) described to be known information in the above description. The computer programs and data stored in the external storage device 906 are loaded to the RAM 902 appropriately under the control of the CPU 901 and become processing targets of the CPU 901.

The I/F 907 functions as an interface for executing data communication with an external device. For example, the video obtainment apparatus A1001 and a display apparatus A1003 described above can be connected to this I/F 907.

The CPU 901, the RAM 902, the ROM 903, the operation unit 904, the display unit 905, the external storage device 906, and the I/F 907 are connected to a bus 908. Note that the hardware arrangement of the computer apparatus applicable to the human body tracking apparatus (A1002, B1002, C1002, or D1002) is not limited to the arrangement shown in FIG. 19.

Although each embodiment described above assumed that the target of the tracking processing is to be a human body, the target of the tracking processing is not limited to the human body and may be another object. In addition, although each embodiment described above assumed that various kinds of display are to be performed on an image during the tracking processing to notify the user of the tracking target object on the image, the present invention is not limited to this. For example, processing to control the imaging direction, the zoom value, the focus position, and the like of the video obtainment apparatus A1001 may be performed as the tracking processing so that the tracking processing target object will constantly appear at the center of the image in a size equal to or larger than a predetermined size.

Also, although the video obtainment apparatus A1001, the human body tracking apparatus (A1002, B1002, C1002, or D1002), and the display apparatus A1003 were assumed to be separate apparatuses in each embodiment described above, two or more of these apparatuses may be integrated into a single apparatus. For example, the human body tracking apparatus (A1002, B1002, C1002, or D1002) described above may be embedded into the video obtainment apparatus A1001 that serves as a camera. In such a case, the video obtainment apparatus A1001 itself will function as an image capturing apparatus that performs human body tracking processing on an image captured by the self-apparatus.

In addition, the arrangements of the human body tracking system (A1000, B1000, C1000, and D1000) shown in FIGS. 1, 8, 10, and 13, respectively, are merely examples, and the present invention is not limited to these arrangements. For example, in a case in which the processing to control the imaging direction, the zoom value, the focus position, and the like of the video obtainment apparatus A1001 is to be performed as the tracking processing, it may be set so that this tracking processing will be performed by the pan head and the controller of the video obtainment apparatus A1001 that serves as the camera.

Sixth Embodiment

Figure 20:
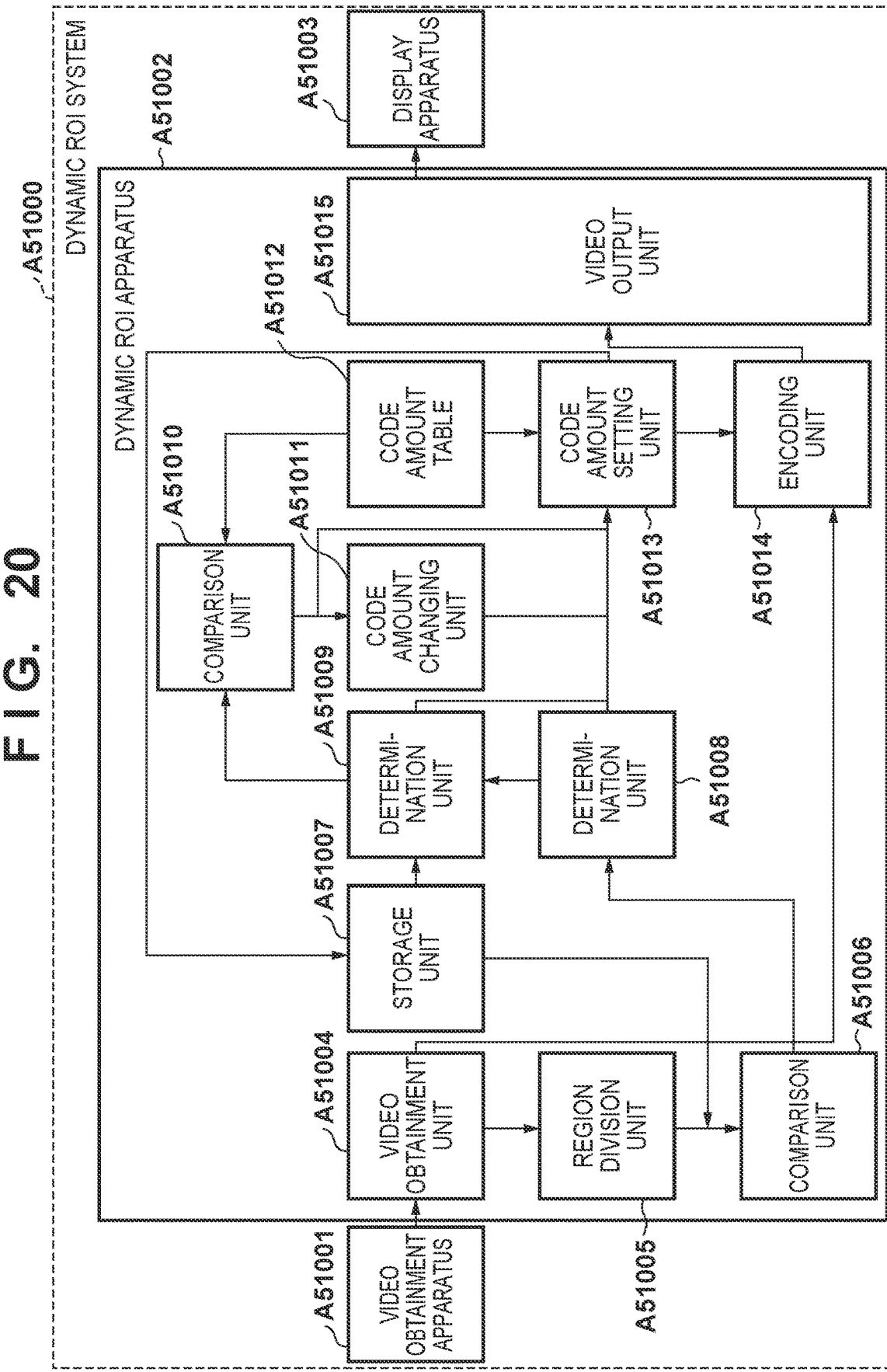
FIG. 20 is a block diagram showing an example of the functional arrangement of a dynamic ROI system.

An example of a dynamic ROI system according to this embodiment will be described first with reference to the block diagram of FIG. 20. As shown in FIG. 20, a dynamic ROI system A51000 according to this embodiment includes a video obtainment apparatus A51001 that obtains a video, a dynamic ROI apparatus A51002 that encodes and outputs an image of each frame of the video, and a display apparatus A51003 that decodes and displays the encoded image of each frame.

The video obtainment apparatus A51001 and dynamic ROI apparatus A51002 are connected to each other via a wireless network and/or a wired network. In addition, the dynamic ROI apparatus A51002 and the display apparatus A51003 are connected to each other via a wireless network and/or a wired network.

The video obtainment apparatus A51001 will be described first. The video obtainment apparatus A51001 is an apparatus that obtains a video (moving image) and supplies the image of each frame forming the video to the dynamic ROI apparatus A51002. The forms in which a video is obtained and supplied from the video obtainment apparatus A51001 are not limited to a specific obtainment form or supplying form.

For example, the video obtainment apparatus A51001 may obtain a video held in the self-apparatus or a video held by an external device, and may sequentially supply the image of each frame of the obtained video to the dynamic ROI apparatus A51002. The video obtainment apparatus A51001 may also capture a video and sequentially supply the image of each frame of the captured video to the dynamic ROI apparatus A51002.

The dynamic ROI apparatus A51002 (image processing apparatus) will be described next. The dynamic ROI apparatus A51002 will encode the image of each frame supplied from the video obtainment apparatus A51001, but will encode a region of each object in the image at a suitable code amount. The dynamic ROI apparatus A51002 will output the encoded image of each frame to the display apparatus A51003.

A video obtainment unit A51004 obtains the image of each frame supplied from the video obtainment apparatus A51001.

A region division unit A51005 performs region division on each image obtained by the video obtainment unit A51004, detects a region (object region) of an object in the image, and specifies an attribute (the type of the object, or the like) of the object in the region. Various kinds of methods such as region splitting, super parsing, fully convolutional neural network (CNN) by deep learning are known as the methods for region division. Although it is assumed that fully convolutional neural network, which allows region division to be performed highly accurately, will be used in this embodiment, any of the methods may be used. Since region splitting, super parsing, fully convolutional neural network, and the like, are known techniques, a description related to these region division techniques will be omitted. The region division unit A51005 will generate, for each object region detected from the image, object information that includes information (for example, the coordinate position of the upper left corner and the coordinate position of the lower right corner of the object region) for specifying the object region in the image and the attribute of the object in the object region.

A comparison unit A51006 uses the object information generated for the image of the current frame by the region division unit A51005 and "past frame object information" stored in a storage unit A51007 to determine the front-and-back relationship and the relationship of the concealment between the overlapping objects in the image of the current frame. Subsequently, although the comparison unit A51006 will output the object information generated for the image of the current frame by the region division unit A51005, the comparison unit will output the pieces of object information of the overlapping objects in the image of the current frame upon adding information expressing the front-and-back relationship and the relationship of the concealment between the objects to the object information of each overlapping object.

Figure 22:
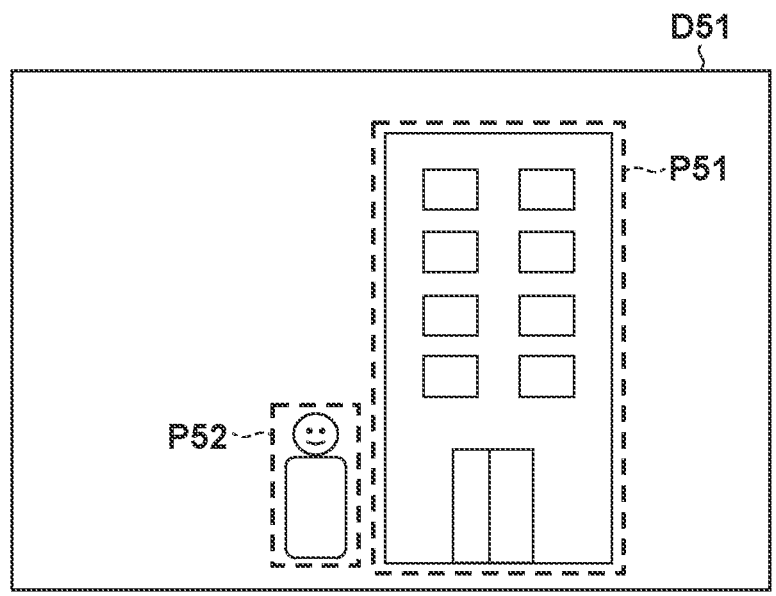
FIG. 22 is a view showing an image D51.

The operation of the comparison unit A51006 will be described with more specific examples. An image D51 shown in FIG. 22 is an (f−2)th frame image (f is an integer equal to 3 or more), and an object region P52 of a person and an object region P51 of a building have been detected in the image D51. Object information including an attribute "person" of the object in the object region P52 and information (for example, the coordinate positions of the upper left corner and the lower right corner of the object region P52) for specifying the object region P52 in the image D51 is generated for the object region P52 of the person. In a similar manner, object information including an attribute "building" of the object in the object region P51 and information (for example, the coordinate positions of the upper left corner and the lower right corner of the object region P51) for specifying the object region P51 in the image D51 is generated for the object region P51 of the building. As shown in FIG. 22 a state in which one of the person and the building overlaps the other has not occurred in the image D51.

Figure 23:
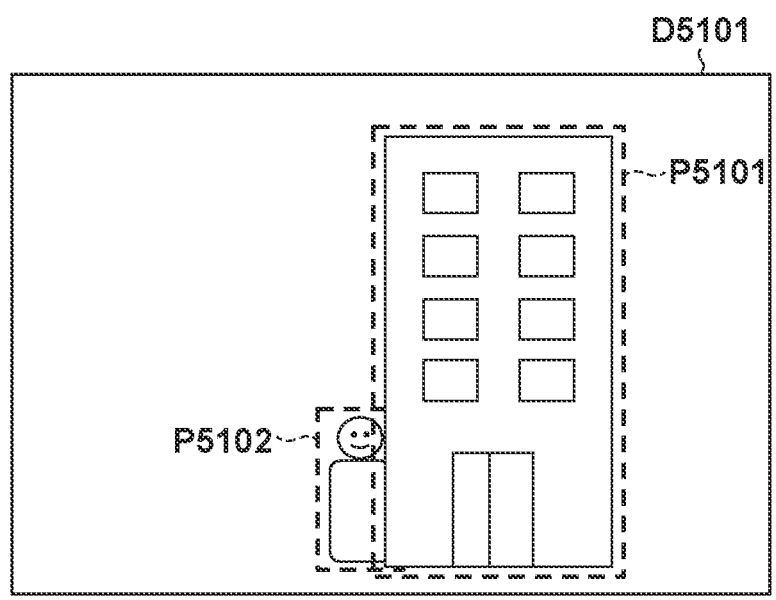
FIG. 23 is a view showing an image D5101.

An image D5101 shown in FIG. 23 is an (f−1)th frame image (an image obtained a frame after the image D51 of FIG. 22), and an object region P5102 of a person and an object region P5101 of a building are detected from the image D5101. Object information including an attribute "person" of the object in the object region P5102 and information (for example, the coordinate positions of the upper left corner and the lower right corner of the object region P5102) for specifying the object region P5102 in the image D5101 is generated for the object region P5102 of the person. In a similar manner, object information including an attribute "building" of the object in the object region P5101 and information (for example, the coordinate positions of the upper left corner and the lower right corner of the object region P5101) for specifying the object region P5101 in the image D5101 is generated for the object region P5101 of the building. As shown in FIG. 23, in the image D5101, the person has moved behind the building from the state shown in the image D51, and a part of the person and the building overlap.

When the pieces of object information of the human body and the building in the image D5101 are obtained from the region division unit A51005, the comparison unit A51006 determines the front-and-back relationship and the relationship of the concealment between the person and the building by using the pieces of object information of the person and the building in the image D5101 and the "pieces of object information of the person and the building in the image D51" stored in the storage unit A51007. As shown in FIGS. 22 and 23, the object region P5102 of the person in the image D5101 is adjacent to the object region P5101 of the building, and has a size smaller than the object region P52 of the person of the preceding frame. This means that an overlap between a part of the person and the building (the person is the background object and the building is the foreground object) has been created because the person has moved behind the building. Hence, the comparison unit A51006 will determine that "the person and the building are overlapping (the person is the background object and the building is the foreground object)" in a case in which the size of the object region P5102 of the person has become smaller than the size of the object region P52 of the person of the preceding frame in a state in which the object region P5102 of the person is adjacent to the object region P5101 of the building. Subsequently, the comparison unit A51006 will add, to the object information of the person, information (background information) expressing that the person is "positioned behind the building", and will add, to the object information of the building, information (foreground information) indicating that the building is "positioned in front of the person".

Figure 24:
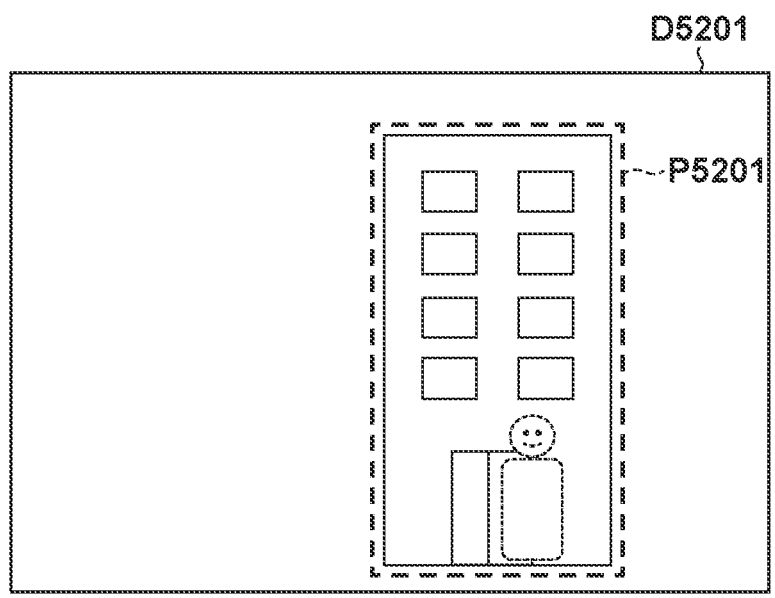
FIG. 24 is a view showing an image D5201.

An image D5201 shown in FIG. 24 is an fth frame image (an image obtained a frame after the image D5101 of FIG. 23). In the image D5201, since the person is concealed by the building (the person concealed by the building is indicated by dotted lines), the object region of the person is not detected although an object region P5201 of the building is detected. The object region of the person will not be detected in a similar manner either in a case in which the person is not completely concealed by the building, but is not detected as a person in the image (or in a case in which the detection accuracy is less than a threshold). Hence, the object information of the person is not generated, and the object information including the attribute "building" of the object in the object region P5201 and the information (for example, the coordinate position of the upper left corner and the coordinate position of the lower right corner of the object region P5201) for specifying the object region P5201 in the image D5201 is generated for the object region P5201 of the building.

If the comparison unit A51006 cannot detect, in the image D5201, the object region of the person determined to be in a state of overlap with (be positioned behind) the building in the image D5101, the comparison unit determines that "the person has been concealed by the building (the person is the background object and the building is the foreground object)". In a case in which it is determined that "the person has been concealed by the building (the person is the background object and the building is the foreground object)", the comparison unit A51006 adds foreground information indicating that the building is "positioned in front of the person (the person is positioned behind the building)" to the object information of the building.

In this manner, while the size (area) of the object region of one object has decreased in accordance with the elapse of time in a state in which the object region of the object is adjacent to the object region of another object, the comparison unit A51006 will add the background information indicating that the object is "positioned behind the other object" to the object information of the object and add the foreground information indicating that the other object is "positioned in front of the object" to the object information of the other object. Subsequently, when the object region of the object is not detected from the image of the current frame after being detected up to the image of the immediately preceding frame while the size of the object region of the object has been decreasing in accordance with the elapse of time, the comparison unit A51006 will determine that the object is concealed by the other object and add the foreground information indicating that the other object is "positioned in front of the object" to the object information of the other object.

Note that the method used to determine the front-and-back relationship and the relationship of the concealment between the overlapping objects in the image of the current frame is not limited to that described above, and various kinds of methods are applicable. Also, the information expressing an overlapping object and that expressing an object in a relationship of concealment and the mode of managing these pieces of information are not limited to those described in the above example.

The storage unit A51007 stores the object information of each object in an image of each past frame.

A determination unit A51008 obtains the pieces of object information of objects in the current frame from the comparison unit A51006. The determination unit A51008 determines whether object information that has been added with the foreground information is present among the pieces of object information obtained from the comparison unit A51006 (determines whether overlapping objects are present in the image of the current frame). The object information to which the foreground information has been added will be referred to as foreground object information hereinafter.

A determination unit A51009 determines whether an object whose elapsed time since the overlap exceeds a predetermined time is present among the overlapping objects in the image of the current frame. For example, the determination unit A51009 sets, as a target object, an object (an object that is to be the foreground object) corresponding to the foreground object information. Next, the determination unit A51009 determines whether the elapsed time since the foreground information has been initially added to the object information of the target object is equal to or less than the predetermined time. In the example shown in FIGS. 22 to 24, it is determined whether the elapsed time since the overlap of the person and the building occurred is equal to or less than the predetermined time. As a result of this determination, if the elapsed time exceeds the predetermined time, the determination unit A51009 will delete the foreground information from the foreground object information. The determination unit A51009 will measure the elapsed time.

A comparison unit A51010 uses the pieces of object information of the objects in the current frame and a code amount table A51012 in which a setting code amount for an attribute of each object has been registered to compare the setting code amounts of the overlapping objects (the foreground object and the background object). A setting code amount that has been preset as the code amount of the region of each object which has an attribute is registered for the attribute of each object in the code amount table A51012.

The comparison unit A51010 obtains, from the code amount table A51012, the setting code amount corresponding to "the attribute of the object", included each piece of foreground object information, as the "setting code amount of the foreground object". Also, in a case in which the foreground information added to the foreground object information indicates that the object is "positioned in front of an object B", the comparison unit A51010 obtains, from the code amount table A51012, the setting code amount corresponding to the attribute included in the object information of the object B as the "setting code amount of the background object". Subsequently, the comparison unit A51010 executes a magnitude comparison between the "setting code amount of the foreground object" and the "setting code amount of the background object". As a result of this magnitude comparison, if the "setting code amount of the foreground object">the "setting code amount of the background object", the comparison unit A51010 will delete the foreground information which had been added to the foreground object information. On the other hand, as a result of this magnitude comparison, if the "setting code amount of the foreground object"<the "setting code amount of the background object", the comparison unit A51010 will transmit the foreground object information to a code amount changing unit A51011 of the next stage.

Figure 25:
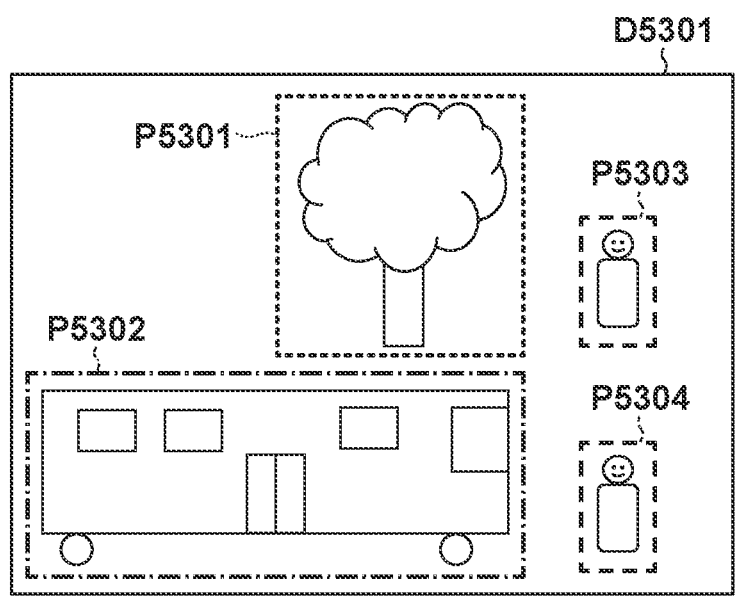
FIG. 25 is a view showing an image D5301.

The operation of the comparison unit A51010 will be described next by raising a more specific example. An image D5301 shown in FIG. 25 includes an object region P5301 of a tree, an object region P5302 of a bus, an object region P5303 of a person, and an object region P5304 of another person. In the case of FIG. 25, setting code amounts are registered in the code amount table A51012 for "tree", "bus", and "person" which are the attributes of the objects. In this case, assume that the setting code amount of a tree<the setting code amount of a person<the setting code amount of a bus represents the magnitude relationship of the setting code amount of a tree, the setting code amount of a person, and the setting code amount of a bus which are registered in the code amount table A51012.

Note that an object region that has been set with a larger code amount will be encoded to have a higher image quality, and an object region that has been set with a smaller code amount will be encoded to have a lower image quality. "Encoded to have a higher image quality" means that "encoding will be performed so that the image quality after the decoding will result in a higher image quality", and this will, for example, further decrease the quantization steps to be used for the encoding process. On the other hand, "encoded to have a lower image quality" means that "encoding will be performed so that the image quality after the decoding will result in a lower image quality", and this will, for example, increase the quantization steps used for the encoding process.

In this embodiment, although a setting code amount corresponding to the attribute of an object in the object region is set for each object region in the image, the encoding amount of the object region of each of the overlapping objects will change in accordance with the attributes of the overlapping objects. Since none of the tree, the bus, and the two persons overlap each other in the image D5301 of FIG. 25, a setting code amount corresponding to the attribute of each object is set for the object region of each object.

Figure 26:
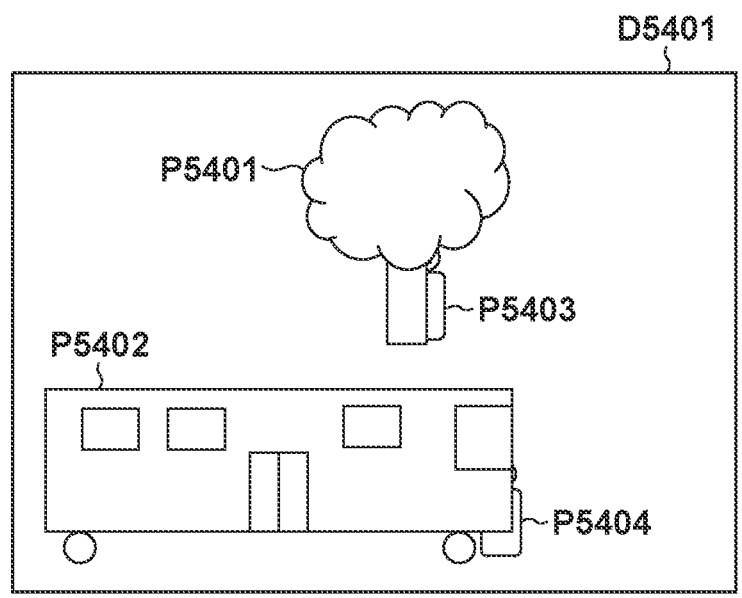
FIG. 26 is a view showing an image D5401.

An image D5401 shown in FIG. 26 is an image obtained a few frames after the image D5301, and a person P5403 is hidden behind a tree P5401, and a person P5404 is hidden behind a bus P5402 because the each person has moved from his/her previous position in the image D5301. Assume that the person P5403 is not detected although the tree P5401 has been detected in the image D5401, and that an object region P5501 of FIG. 27 has been detected as the object region of the tree P5401 as a result. Assume also that the person P5404 is not detected although the bus P5402 has been detected in the image D5401, and that an object region P5502 of FIG. 27 has been detected as the object region of the bus P5402 as a result. The code amount of each of such object regions P5501 and P5502 will be set in the following manner.

The comparison unit A51010 specifies the object (the person P5404) positioned behind the bus P5402 from the foreground information added to the object information of the bus P5402. The comparison unit A51010 performs a magnitude comparison between the setting code amount of the bus P5402 registered in the code amount table A51012 and the setting code amount of the person P5404 registered in the code amount table A51012. As a result of this magnitude comparison, since the setting code amount of the bus P5402 as the foreground object>the setting code amount of the person P5404 as the background object, the comparison unit A51010 deletes the foreground information added to the object information of the bus P5402 as the foreground object.

In addition, the comparison unit A51010 obtains the object (the person P5403) positioned behind the tree P5401 from the foreground information added to the object information of the tree P5401. Next, the comparison unit A51010 performs a magnitude comparison between the setting code amount of the tree P5401 registered in the code amount table A51012 and the setting code amount of the person P5403 registered in the code amount table A51012. As a result of this magnitude comparison, since the setting code amount of the tree P5401 as the foreground object<the setting code amount of the person P5403 as the background object, the comparison unit A51010 transmits the object information of the tree P5401 as the foreground object to a code amount changing unit A51011.

In a case in which the foreground information added to the foreground object information that has been received from the comparison unit A51010 indicates that the object is "positioned in front of the object B", the code amount changing unit A51011 obtains the setting code amount corresponding to the attribute included in the object information of the object B from the code amount table A51012. The code amount changing unit A51011 then sets the obtained setting code amount as the code amount of the object region corresponding to the foreground object information. That is, in a case in which the setting code amount of the background object is larger than the setting code amount of the foreground object among the overlapping objects, the code amount changing unit A51011 will set the setting code amount of the background object as the code amount of the foreground object.

Figure 27:
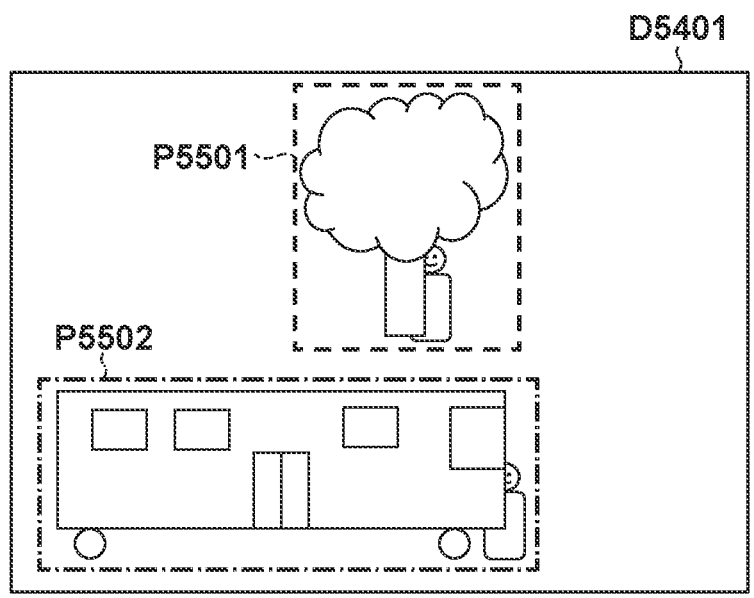
FIG. 27 is a view showing an object region in the image D5401.

In the example shown in FIG. 27, the setting code amount corresponding to the person P5403 positioned behind the tree P5401 is set as the code amount of the object region P5501 of the tree P5401. Also, the code amount of the object region P5502 of the bus P5402 does not change. Since the visibility of the person P5403 will degrade if the code amount of the tree P5401 is set in the object region P5501, the code amount corresponding to the person P5403 in the background will be set to improve the visibility of the person. In addition, since the visibility of the person P5404 will not degrade even if the code amount of the bus P5402 is set in the object region P5502, the code amount setting will not be changed.

A code amount setting unit A51013 obtains, from the code amount table A51012, the setting code amount corresponding to an attribute in the object information of an object region to which a code amount has not been set yet, and sets the obtained setting code amount as the code amount of the object region. In addition, the code amount setting unit A51013 stores the pieces of object information of the current frame which are obtained via the region division unit A51005, the comparison unit A51006, the determination unit A51008, the determination unit A51009, and the comparison unit A51010 in the storage unit A51007.

An encoding unit A51014 encodes the image of the current frame, but encodes each object region of the image by the code amount set to the object region based on the processing described above.

A video output unit A51015 outputs an image encoded (encoded image) by the encoding unit A51014 to the display apparatus A51003. Note that the output destination of the encoded image is not limited to the display apparatus A51003, and an internal memory device or an external memory device of the dynamic ROI apparatus A51002 may be set as the output destination or an external apparatus that can communicate with the dynamic ROI apparatus A51002 may be set as the output destination.

The display apparatus A51003 will be described next. The display apparatus A51003 decodes the encoded image output from the video output unit A51015 and displays the decoded image. The display apparatus A51003 may display the decoded image on a liquid crystal screen or a touch panel screen or project the decoded image onto a projection surface. Although the display apparatus A51003 is shown as an apparatus separate from the dynamic ROI apparatus A51002 in FIG. 20, the dynamic ROI apparatus A51002 and the display apparatus A51003 may be integrated into a single apparatus.

Figure 21:
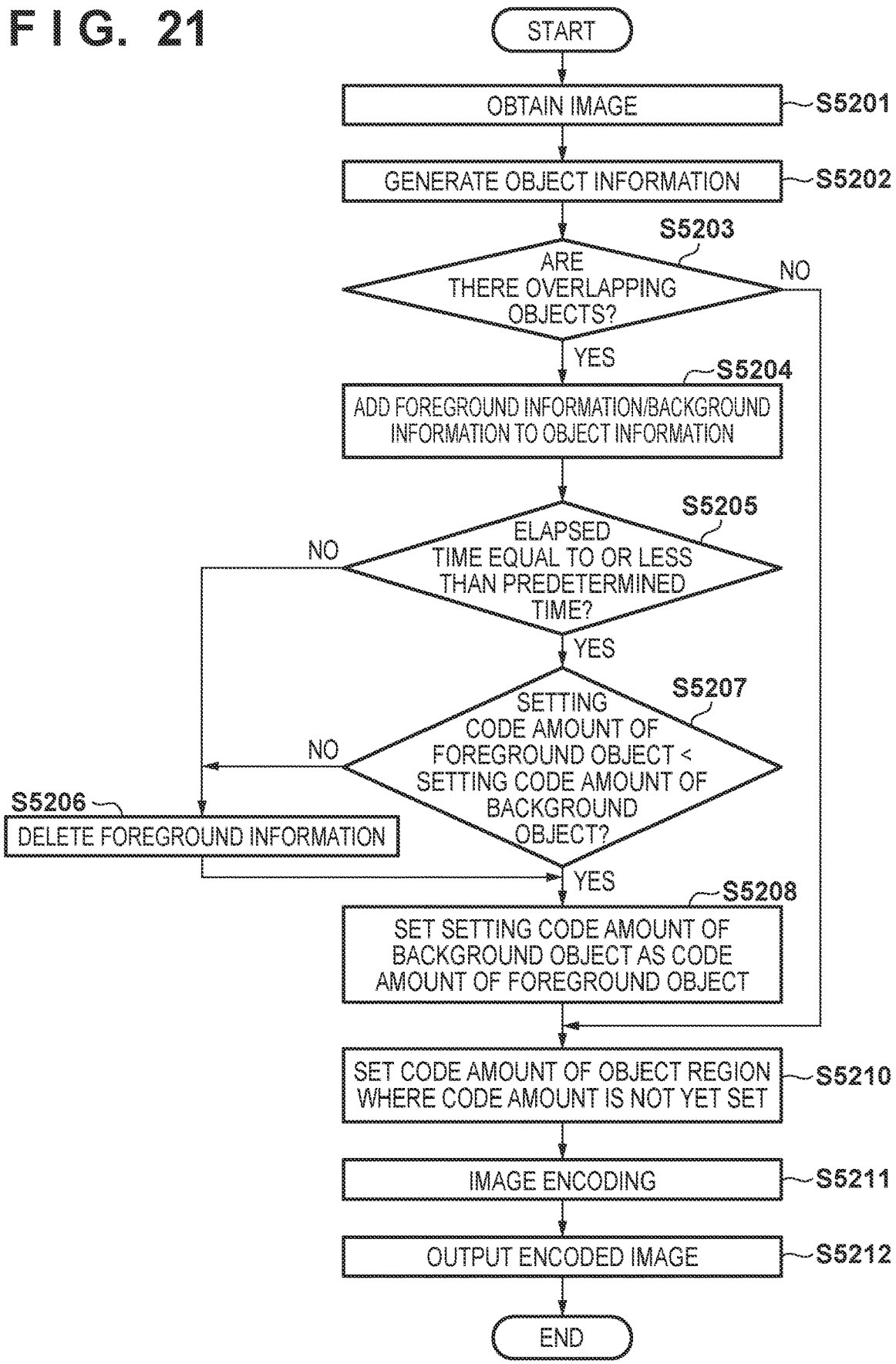
FIG. 21 is a flowchart of processing performed by a dynamic ROI apparatus A51002.

Processing performed by the dynamic ROI apparatus A51002 to encode and to output an image of one frame will be described next with reference to the flowchart of the processing shown in FIG. 21. The dynamic ROI apparatus A51002 performs the processing according to the flowchart of FIG. 21 on the image of each frame obtained from the video obtainment apparatus A51001. Also, the condition to end the processing according to the flowchart of FIG. 21 is not limited to a specific condition and may be, for example, the fact that "a user has turned off the power switch (not shown) of the dynamic ROI apparatus A51002".

In step S5201, the video obtainment unit A51004 obtains the image supplied from the video obtainment apparatus A51001. In step S5202, the region division unit A51005 detects the object region of each object in the image obtained in step S5201 and generates the object information for each object region.

In step S5203, the comparison unit A51006 determines whether overlapping objects are present in the image obtained in step S5201. As a result of this determination, if overlapping objects are present in the image obtained in step S5201, the process advances to step S5204. If overlapping objects are not present in the image obtained in step S5201, the process advances to step S5210.

In a case in which the size of the object region of an object has become smaller than the size of the object region of the same object in the preceding frame in a state in which the object region of the object is adjacent to the object region of another object, the comparison unit A51006 will determine that overlapping objects are present in the image obtained in step S5201. At this time, in step S5204, the comparison unit A51006 adds the background information indicating that the object is "positioned behind the other object" to the object information of this object, and adds the foreground information indicating that the other object is "positioned in front of the object" to the object information of this other object.

In addition, in a case in which the object region of the other object that had been determined to be overlapping the object up to the immediately preceding frame cannot be detected in the image obtained in step S5201, the comparison unit A51006 will determine that overlapping objects are present in the image obtained in step S5201. At this time, in step S5204, the comparison unit A51006 will add the foreground information indicating that the object is "positioned in front of the other object" to the object information of this object.

In step S5205, the determination unit A51008 sets the object corresponding to the foreground object information as a target object, and the determination unit A51009 determines whether an elapsed time T since the foreground information has been initially added to the object information of the target object is equal to or less than a predetermined time θ.

As a result of this determination, if the elapsed time T is equal to or less than the predetermined time θ, the process advances to step S5207. If the elapsed time T exceeds the predetermined time θ, the process advances to step S5206. In step S5206, the determination unit A51009 deletes the foreground information from the foreground object information.

In step S5207, the comparison unit A51010 performs a magnitude comparison between the "setting code amount of the foreground object" and the "setting code amount of the background object". As a result of this magnitude comparison, if the "setting code amount of the foreground object">the "setting code amount of the background object", the process advances to step S5206. On the other hand, as a result of this magnitude comparison, if the "setting code amount of the foreground object"<the "setting code amount of the background object", the process advances to step S5208.

In step S5208, the comparison unit A51010 transmits the foreground object information to the code amount changing unit A51011 of the subsequent stage. If the foreground information added to the foreground object information indicates that the object is "positioned in front of the object B", the code amount changing unit A51011 sets the setting code amount corresponding to the attribute of the object B as the code amount of the object region corresponding to the foreground object information. The processes of steps S5204 to S5208 described above are performed for each set of objects determined to be in an overlapping state.

In step S5210, the code amount setting unit A51013 obtains, from the code amount table A51012, the setting code amount corresponding to the attribute in the object information of an object region to which the code amount has not been set yet, and sets the obtained setting code amount as the code amount of this object region. The code amount setting unit A51013 also stores the pieces of object information of the current frame at the point of step S5208 in the storage unit A51007.

In step S5211, the encoding unit A51014 encodes the image of the current frame, but encodes each object region in the image by the code amount set for the object region based on the processing described above. In step S5212, the video output unit A51015 outputs the image, encoded by the encoding unit A51014 in step S5211, to the display apparatus A51003.

In this manner, according to this embodiment, in a case in which an object set with a large code amount is positioned behind an object set with a small code amount, the visibility of the background object can be improved by setting the foreground object to have the same code amount as that set to the background object.

Note that the processes of steps S5205 and S5206 may be deleted as needed. In such a case, the processes of step S5207 and subsequent steps will be performed even in a case in which an object whose elapsed time since the occurrence of the overlap exceeds the predetermined time is set as the target object.

In addition, the setting code amount may be changed not only based on a magnitude comparison between the "setting code amount of the foreground object" and the "setting code amount of the background object", but also by referring to the magnitude of the difference between these setting code amounts. For example, in a case in which the "setting code amount of the foreground object"<the "setting code amount of the background object", it may be arranged so that a larger code amount will be set to the foreground object as the difference between these setting code amounts becomes larger.

Seventh Embodiment

Assume that differences in the arrangement from the sixth embodiment will be described in each of the following embodiments including this embodiment, and that the arrangement is similar to that of the sixth embodiment unless particularly mentioned. In the seventh embodiment, a comparison unit A51010 determines whether an "attribute of an object" included in a piece of foreground object information is an "attribute of an object in which all of or a part of another object positioned behind the object is visible" (visibility attribute). If the "attribute of the object" included in the foreground object information is a visibility attribute, the comparison unit A51010 will transmit the foreground object information to a code amount changing unit A51011 of the subsequent stage. On the other hand, if the "attribute of the object" included in the foreground object information is not a visibility attribute, the comparison unit A51010 will delete the foreground information added to the foreground object information.

The operation of the comparison unit A51010 according to this embodiment will be described next by raising a more specific example. An image D5601 shown in FIG. 30 includes an object region P5601 of a building, an object region P5602 of a tree, an object region P5603 of a person, and an object region P5604 of another person. Assume that the setting code amount has already been set to each of the object region P5601 of the building, the object region P5602 of the tree, the object region P5603 of the person, and the object region P5604 of the other person.

Figure 30:
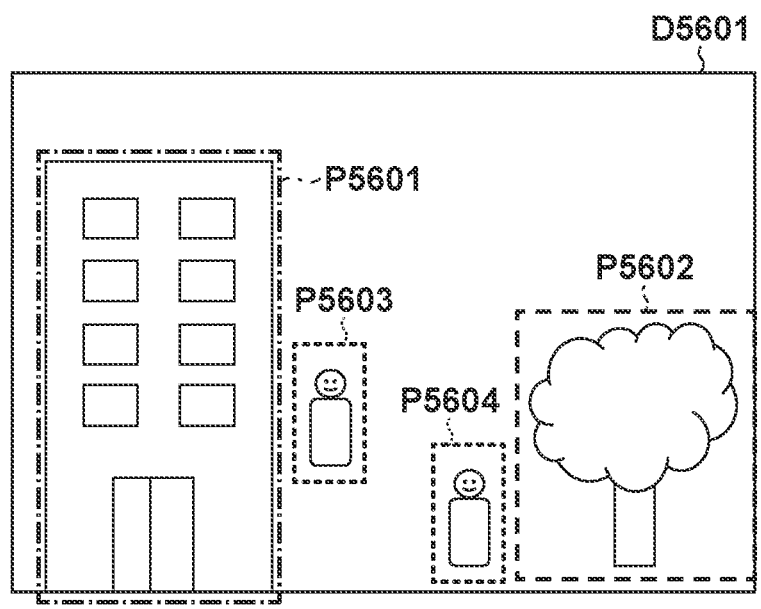
FIG. 30 is a view showing an image D5601.
Figure 31:
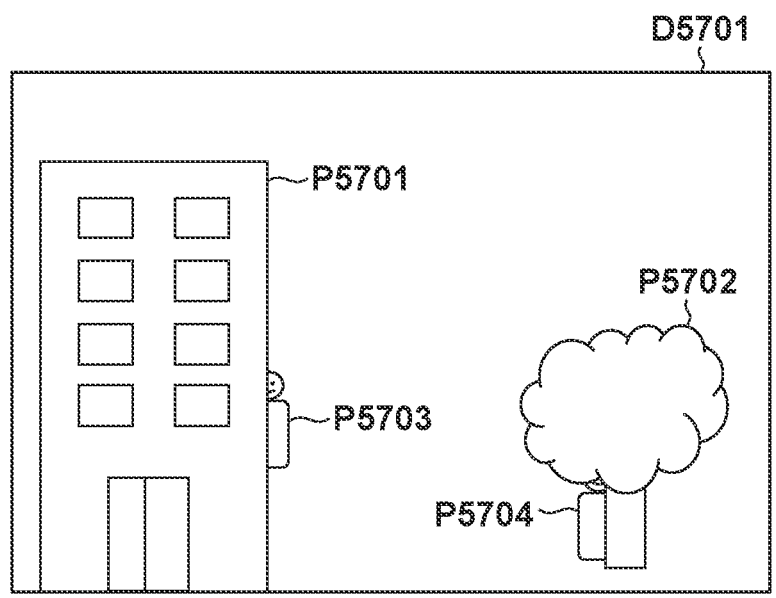
FIG. 31 is a view showing an image D5701.

An image D5701 shown in FIG. 31 is an image obtained a few frames after the image D5601, and a person P5703 is hidden behind a building P5701 and a person P5704 is hidden behind a tree P5702 because the each person has moved from his/her previous position in the image D5601. In this case, although the object positioned behind the building P5701 is not visible via the building P5701, the object hidden behind the tree P5702 is visible through the gaps between the leaves and the branches of the tree. Hence, in this case, a visibility attribute table in which whether an attribute is a visibility attribute is registered for the attribute of each object is used instead of a code amount table A51012. In the case of FIGS. 30 and 31, the attribute of building P5701 is not registered as a visibility attribute and the attribute of the tree P5702 is registered as a visibility attribute in the visibility attribute table.

Hence, in the case of this embodiment, the comparison unit A51010 will refer to the visibility attribute table to determine whether the attribute of an object included in the foreground object information is registered as a visibility attribute in the visibility attribute table. As a result of this determination, if the attribute of the object included in the foreground object information is registered as a visibility attribute in the visibility attribute table, the comparison unit A51010 will transmit the foreground object information to the code amount changing unit A51011 of the subsequent stage. On the other hand, as a result of this determination, if the attribute of the object included in the foreground object information is not registered as a visibility attribute in the visibility attribute table, the comparison unit A51010 will delete the foreground information added to the foreground object information.

Figure 29:
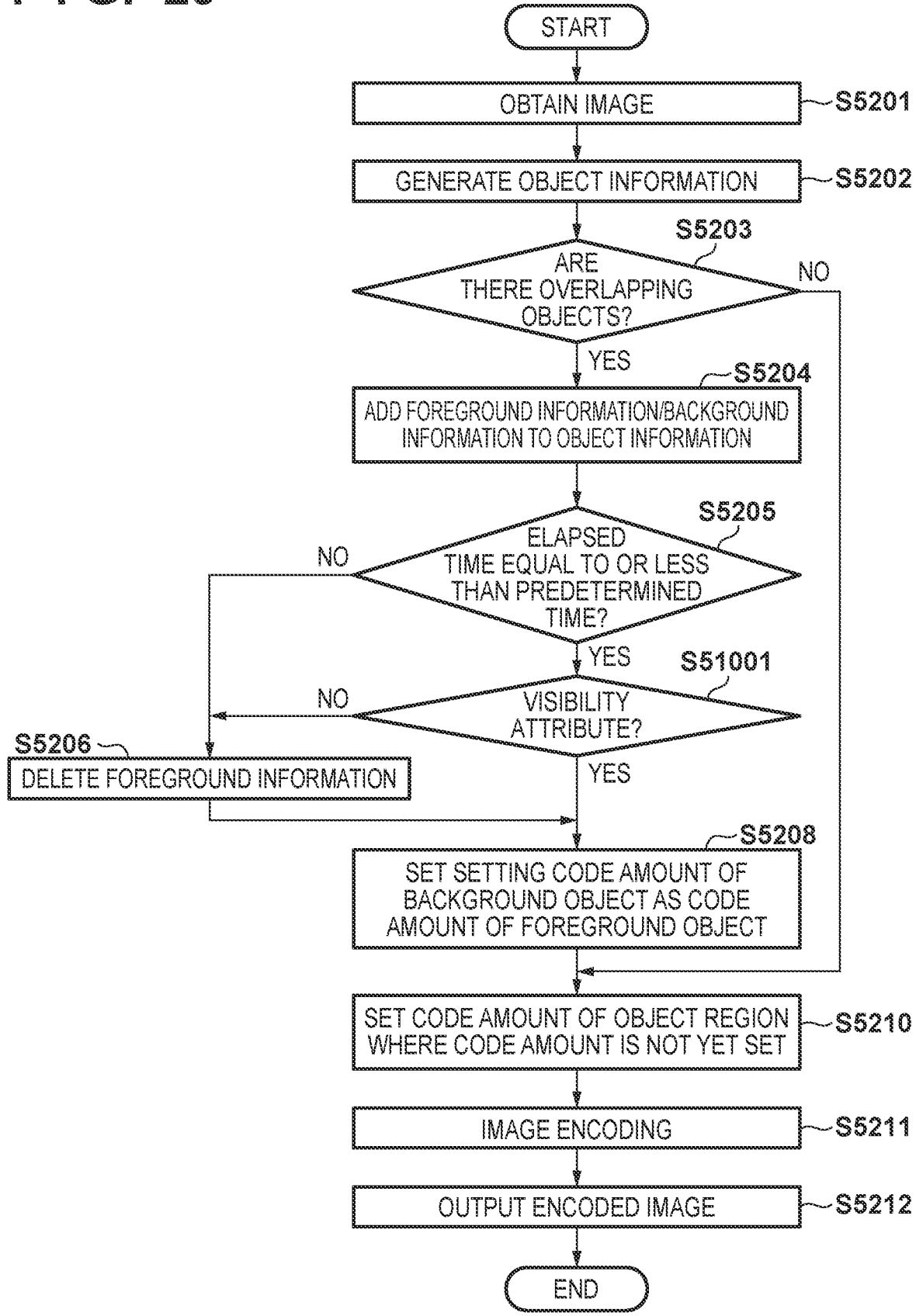
FIG. 29 is a flowchart of processing performed by a dynamic ROI apparatus A51002.

Processing performed by a dynamic ROI apparatus A51002 to encode and output an image of one frame according to this embodiment will be described next with reference to the flowchart of the processing shown in FIG. 29. The dynamic ROI apparatus A51002 performs the processing according to the flowchart of FIG. 29 on the image of each frame obtained from a video obtainment unit A51004. Also, the condition to end the processing according to the flowchart of FIG. 29 is not limited to a specific condition and may be, for example, the fact that "a user has turned off the power switch (not shown) of the dynamic ROI apparatus A51002".

In step S51001, the comparison unit A51010 refers to the visibility attribute table and determines whether the attribute of an object included in the foreground object information is registered as a visibility attribute in the visibility attribute table. As a result of this determination, if the attribute of the object included in the foreground object information is registered as a visibility attribute in the visibility attribute table, the process advances to step S5208. On the other hand, as a result of this determination, if the attribute of the object included in the foreground object information is not registered as a visibility attribute in the visibility attribute table, the process advances to step S5206.

In this manner, according to this embodiment, in a case in which the background object is visible through the foreground object even when the objects overlap, the visibility of the background object can be improved by setting the code amount of the foreground object to be the same as the code amount corresponding to the background object.

Eight Embodiment

Although the functional units shown in FIG. 20 may be implemented by hardware, some of the functional units may be implemented by software. For example, a storage unit A51007 may be implemented by a memory, a code amount table A51012 and a visibility attribute table may be implemented as data, and each functional unit other than these may be implemented by a computer program. In this case, a computer apparatus that includes the storage unit A51007 as a memory and the code amount table A51012 and a visibility attribute table as data, and can execute a computer program to implement each functional unit other than these is applicable to a dynamic ROI apparatus A51002.

Figure 28:
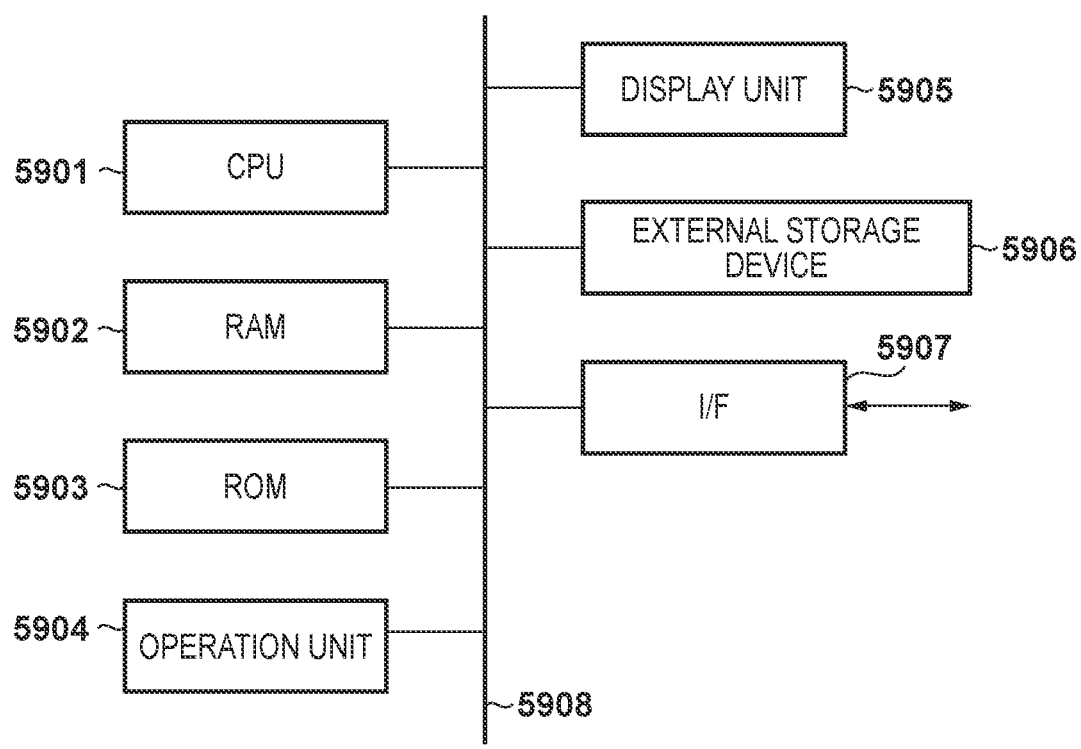
FIG. 28 is a block diagram showing an example of the hardware arrangement of a computer apparatus.

An example of the hardware arrangement of the computer apparatus that is applicable to the dynamic ROI apparatus A51002 will be described with reference to the block diagram of FIG. 28. An apparatus such a PC (personal computer), a tablet terminal apparatus, a smartphone, or the like, can be applied to such computer apparatus.

A CPU 5901 executes various kinds of processing by using computer programs and data stored in a RAM 5902 and a ROM 5903. As a result, the CPU 5901 executes or controls each processing described above as that to be performed by the dynamic ROI apparatus A51002 in addition to controlling the overall operation of the computer apparatus.

The RAM 5902 includes an area for storing each computer program and data loaded from the ROM 5903 or an external storage device 5906. The RAM 5902 further includes an area for storing data (for example, the image of each frame received from a video obtainment apparatus A51001) received from an external device via an I/F (interface) 5907. The RAM 5902 also includes a work area used when the CPU 5901 is to execute the various kinds of processing. In this manner, the RAM 5902 can appropriately provide various kinds of areas. The ROM 5903 stores the setting data and the activation program of the computer apparatus.

An operation unit 5904 is formed by user interfaces such as a keyboard, a mouse, a touch panel, and the like, and a user can operate the operation unit to input various kinds of instructions to the CPU 5901.

A display unit 5905 is formed by a liquid crystal screen, a touch panel, or the like, and can display an image or characters to display the processing result of the CPU 5901. Note that the display unit 5905 may be a projection device such as a projector that projects images and characters.

The external storage device 5906 is a large-capacity information storage device represented by a hard disk drive device. The external storage device 5906 stores an OS (Operating System) and computer programs to be executed by the CPU 5901 to implement the functions of the functional units excluding the storage unit A51007, the code amount table A51012, and the visibility attribute table shown in FIG. 20. In addition, the external storage device 5906 stores the data of the code amount table A51012, the data of the visibility attribute table, and information (such as the predetermined time and the like) described to be known information in the above description. The computer programs and data stored in the external storage device 5906 are loaded to the RAM 5902 appropriately under the control by the CPU 5901 and become processing targets of the CPU 5901.

The I/F 5907 functions as an interface for executing data communication with an external device. For example, the video obtainment apparatus A51001 and a display apparatus A51003 described above can be connected to this I/F 5907.

The CPU 5901, the RAM 5902, the ROM 5903, the operation unit 5904, the display unit 5905, the external storage device 5906, and the I/F 5907 are connected to a bus 5908. Note that the hardware arrangement of the computer apparatus applicable to the dynamic ROI apparatus A51002 is not limited to the arrangement shown in FIG. 28.

In addition, although the video obtainment apparatus A51001, the dynamic ROI apparatus A51002, and the display apparatus A51003 were assumed to be separate apparatuses in each embodiment described above, two or more of these apparatuses may be integrated into a single apparatus. For example, the dynamic ROI apparatus A51002 described above may be embedded into the video obtainment apparatus A51001 that serves as a camera. In such a case, the video obtainment apparatus A51001 itself will function as an image capturing apparatus that sets a code amount to each object region in an image captured by the self-apparatus, encodes each object region in accordance with the code amount, and outputs the encoded image.

Some or all of the embodiments and the modifications described above may be appropriately combined. In addition, some or all of the embodiments and the modifications described above may be selectively used.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
    a computer executing instructions that, when executed by the computer, cause the computer:
    (a) to detect a tracking target object in an image;
    (b) to execute tracking processing to track the tracking target object;
    (c) to determine whether an attribute of an object detected from the image is a predetermined attribute;
    (d) to identify, in a case when a first state in which the tracking target object is detected changes to a second state in which the tracking target object is not detected, a given object that is included in the image and is positioned at least partially in front of the tracking target object in the second state, based on a position of the tracking target object in the first state;
    (e) to control the tracking processing performed on the tracking target object, based on a determination result of whether an attribute of the given object is the predetermined attribute; and
    (f) to determine, based on the determination result of whether the attribute of the given object is the predetermined attribute, whether to continue performing the tracking processing on the tracking target object for a predetermined time,
    wherein the tracking processing on the tracking target object is continued until at least the predetermined time has elapsed in a case when a determination to continue the tracking processing on the tracking target object for the predetermined time has been made.

2. The apparatus according to claim 1, wherein, whether to end the tracking processing on the tracking target object is determined based on the determination result of whether the attribute of the given object is the predetermined attribute, and the tracking processing on the tracking target object is ended in a case when a determination to end the tracking processing on the tracking target object has been made.

3. The apparatus according to claim 1, wherein, in a case when the given object is adjacent to the tracking target object in the first state, the given object in the second state is identified as an object positioned in front of the tracking target object.

4. The apparatus according to claim 1, wherein, in a case when the given object overlaps the tracking target object in the image in the first state, the given object in the second state is identified as an object positioned in front of the tracking target object.

5. The apparatus according to claim 1, wherein the tracking processing performed on the tracking target object is controlled further based on a position of the tracking target object in the first state.

6. The apparatus according to claim 1, wherein the predetermined time is determined in accordance with a size of the given object.

7. The apparatus according to claim 1, wherein the tracking processing performed on the tracking target object is continued in a case when it is determined that the attribute of the given object is the predetermined attribute, and the tracking processing performed on the tracking target object is ended in a case when it is determined that the attribute of the given object is not the predetermined attribute.

8. The apparatus according to claim 1, wherein the predetermined attribute is at least one of a tree, a utility pole, a traffic light, a fence, and a building, and the tracking processing performed on the tracking target object is ended in a case when it is determined that the attribute of the given object is not the predetermined attribute.

9. An image processing method comprising:
    detecting a tracking target object in an image;
    executing tracking processing to track the tracking target object;
    determining whether an attribute of an object detected from the image is a predetermined attribute;
    identifying, in a case when a first state in which the tracking target object is detected changes to a second state in which the tracking target object is not detected, a given object that is included in the image and is positioned at least partially in front of the tracking target object in the second state, based on a position of the tracking target object in the first state;
    controlling the tracking processing performed on the tracking target object, based on a determination result of whether an attribute of the given object is the predetermined attribute; and
    determining, based on the determination result of whether the attribute of the given object is the predetermined attribute, whether to continue performing the tracking processing on the tracking target object for a predetermined time,
    wherein the tracking processing on the tracking target object is continued until at least the predetermined time has elapsed in a case when a determination to continue the tracking processing on the tracking target object for the predetermined time has been made.

10. The method according to claim 9, wherein, whether to end the tracking processing on the tracking target object is determined based on the determination result of whether the attribute of the given object is the predetermined attribute, and the tracking processing on the tracking target object is ended in a case when a determination to end the tracking processing on the tracking target object has been made.

11. The method according to claim 9, wherein, in a case when the given object is adjacent to the tracking target object in the first state, the given object in the second state is identified as an object positioned in front of the tracking target object.

12. The method according to claim 9, wherein, in a case when the given object overlaps the tracking target object in the image in the first state, the given object in the second state is identified as an object positioned in front of the tracking target object.

13. The method according to claim 9, wherein the tracking processing performed on the tracking target object is controlled further based on a position of the tracking target object in the first state.

14. The method according to claim 9, wherein the predetermined time is determined in accordance with a size of the given object.

15. The method according to claim 9, wherein the tracking processing performed on the tracking target object is continued in a case when it is determined that the attribute of the given object is the predetermined attribute, and the tracking processing performed on the tracking target object is ended in a case when it is determined that the attribute of the given object is not the predetermined attribute.

16. The apparatus according to claim 9, wherein the predetermined attribute is at least one of a tree, a utility pole, a traffic light, a fence, and a building, and the tracking processing performed on the tracking target object is ended in a case when it is determined that the attribute of the given object is not the predetermined attribute.

17. A non-transitory computer-readable storage medium storing a program for causing a computer to execute instructions that, when executed, cause the computer:
to detect a tracking target object in an image;
to execute tracking processing to track the tracking target object;
to determine whether an attribute of an object detected from the image is a predetermined attribute;
to identify, in a case when a first state in which the tracking target object is detected changes to a second state in which the tracking target object is not detected, a given object that is included in the image and is positioned at least partially in front of the tracking target object in the second state, based on a position of the tracking target object in the first state;
to control the tracking processing performed on the tracking target object, based on a determination result of whether an attribute of the given object is the predetermined attribute; and
to determine, based on the determination result of whether the attribute of the given object is the predetermined attribute, whether to continue performing the tracking processing on the tracking target object for a predetermined time,
wherein the tracking processing on the tracking target object is continued until at least the predetermined time has elapsed in a case when a determination to continue the tracking processing on the tracking target object for the predetermined time has been made.

18. The medium according to claim 17, wherein, whether to end the tracking processing on the tracking target object is determined based on the determination result of whether the attribute of the given object is the predetermined attribute, and the tracking processing on the tracking target object is ended in a case when a determination to end the tracking processing on the tracking target object has been made.

19. The medium according to claim 17, wherein, in a case when the given object is adjacent to the tracking target object in the first state, the given object in the second state is identified as an object positioned in front of the tracking target object.

20. The medium according to claim 17, wherein, in a case when the given object overlaps the tracking target object in the image in the first state, the given object in the second state is identified as an object positioned in front of the tracking target object.

21. The medium according to claim 17, wherein the tracking processing performed on the tracking target object is controlled further based on a position of the tracking target object in the first state.

22. The medium according to claim 17, wherein the predetermined time is determined in accordance with a size of the given object.

23. The medium according to claim 17, wherein the tracking processing performed on the tracking target object is continued in a case when it is determined that the attribute of the given object is the predetermined attribute, and the tracking processing performed on the tracking target object is ended in a case when it is determined that the attribute of the given object is not the predetermined attribute.

24. The medium according to claim 17, wherein the predetermined attribute is at least one of a tree, a utility pole, a traffic light, a fence, and a building, and the tracking processing performed on the tracking target object is ended in a case when it is determined that the attribute of the given object is not the predetermined attribute.

* * * * *